United States Patent
Lieto et al.

(10) Patent No.: US 12,432,152 B2
(45) Date of Patent: Sep. 30, 2025

(54) DEPENDENCY-AWARE QUALITY OF SERVICE PROFILE PROVISIONING

(71) Applicant: Nokia Technologies Oy, Espoo (FI)

(72) Inventors: Alessandro Lieto, Stuttgart (DE); Mathieu Boussard, Massy (FR); Ilaria Malanchini, Stuttgart (DE); Qi Liao, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/501,312

(22) Filed: Nov. 3, 2023

(65) Prior Publication Data

US 2025/0150400 A1    May 8, 2025

(51) Int. Cl.
*H04L 47/24* (2022.01)
*H04L 43/0811* (2022.01)
*H04L 47/80* (2022.01)

(52) U.S. Cl.
CPC .......... *H04L 47/24* (2013.01); *H04L 43/0811* (2013.01); *H04L 47/805* (2013.01)

(58) Field of Classification Search
CPC ....... G06F 9/5038; G06F 16/00; H04L 63/20; H04L 41/5025
See application file for complete search history.

(56) References Cited

U.S. PATENT DOCUMENTS

| | | | |
|---|---|---|---|
| 11,172,048 B2 * | 11/2021 | Chatterjee | H04L 41/149 |
| 2011/0321054 A1 * | 12/2011 | Chetlur | G06Q 10/10 |
| | | | 718/103 |
| 2018/0143858 A1 | 5/2018 | Sanjabi et al. | |
| 2022/0050714 A1 * | 2/2022 | Grimshaw | G06F 9/4856 |
| 2022/0223035 A1 * | 7/2022 | Yang | G08G 1/091 |
| 2023/0143458 A1 | 5/2023 | Park et al. | |
| 2024/0303113 A1 * | 9/2024 | Gutierrez | G06F 9/3838 |
| 2024/0378214 A1 * | 11/2024 | Van de Walle | G06F 16/27 |

FOREIGN PATENT DOCUMENTS

WO    WO-2023192303 A1 * 10/2023    ........ H04W 28/0263

OTHER PUBLICATIONS

"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.

(Continued)

*Primary Examiner* — Chirag R Patel
(74) *Attorney, Agent, or Firm* — ALSTON & BIRD LLP

(57) ABSTRACT

Systems, methods, apparatuses, and computer program products for dependency-aware quality of service (QoS) profile provisioning. The method may include obtaining information on at least one application data flow, and dependency information between one application and at least one other application. The method may also include receiving, from a network, information on an updated quality of service profile for the at least one application, and information on another updated quality of service profile for the at least one other application. The updated quality of service profile and the another updated quality of service profile may be selected based on the dependency graph.

20 Claims, 16 Drawing Sheets

(56) References Cited

OTHER PUBLICATIONS

"5G QoS for Industrial Automation", 5G-ACIA White Paper, 2024, 27 pages.
Chen et al., "AAGA: Affinity-Aware Grouping for Allocation of Virtual Machines", IEEE 27th International Conference on Advanced Information Networking and Applications (AINA), Mar. 25-28, 2013, pp. 235-242.
Carrión et al., "Kubernetes Scheduling: Taxonomy, ongoing issues and challenges", ACM Computing Surveys, vol. 55, No. 7 Article No. 138, pp. 1-36.
International Search Report and Written Opinion received for corresponding Patent Cooperation Treaty Application No. PCT/EP2024/080402, dated Mar. 10, 2025, 15 pages.

* cited by examiner

DEPENDENCY-AWARE QUALITY OF SERVICE PROFILE PROVISIONING

TECHNICAL FIELD

Some example embodiments may generally relate to mobile or wireless technology and associated telecommunication systems, such as Long Term Evolution (LTE) or fifth generation (5G) new radio (NR) access technology, or 5G beyond, or other communications systems. For example, certain example embodiments may relate to apparatuses, systems, and/or methods for dependency-aware quality of service (QoS) profile provisioning.

BACKGROUND

Examples of mobile or wireless telecommunication technology and associated systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, fifth generation (5G) radio access technology or NR access technology, and/or 5G-Advanced. 5G wireless systems refer to the next generation (NG) of radio systems and network architecture. 5G network technology is mostly based on NR technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include obtaining information on at least one application data flow, and dependency information between one application and at least one other application. According to certain example embodiments, the at least one application data flow may be configured to operate under a quality of service profile, and the at least one other application is configured to operate under another quality of service profile. According to certain example embodiments, a dependency graph may be based on (e.g., generated based on) the information on the at least one application data flow and the dependency information. The method may also include receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus. The apparatus may include at least one processor and at least one memory storing instructions that, when executed by the at least one processor, cause the apparatus at least to obtain information on at least one application data flow, and dependency information between one application and at least one other application. According to certain example embodiments, the at least one application data flow may be configured to operate under a quality of service profile, and the at least one other application may be configured to operate under another quality of service profile. According to certain example embodiments, a dependency graph may be based on (e.g., generated based on) the information on the at least one application data flow and the dependency information. The apparatus may also be caused to receive, from a network, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus. The apparatus may include means for obtaining information on at least one application data flow, and dependency information between one application and at least one other application. According to certain example embodiments, the at least one application data flow may be configured to operate under a quality of service profile, and the at least one other application may be configured to operate under another quality of service profile. According to certain example embodiments, a dependency graph may be based on (e.g., generated based on) the information on the at least one application data flow and the dependency information. The apparatus may also include means for receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

In accordance with other example embodiments, a non-transitory computer readable medium may be encoded with instructions that may, when executed in hardware, perform a method. The method may include obtaining information on at least one application data flow, and dependency information between one application and at least one other application. According to certain example embodiments, the at least one application data flow may be configured to operate under a quality of service profile, and the at least one other application is configured to operate under another quality of service profile. According to certain example embodiments, a dependency graph may be based on (e.g., generated based on) the information on the at least one application data flow and the dependency information. The method may also include receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to a computer program product that performs a method. The method may include obtaining information on at least one application data flow, and dependency information between one application and at least one other application. According to certain example embodiments, the at least one application data flow may be configured to operate under a quality of service profile, and the at least one other application is configured to operate under another quality of service profile. According to certain example embodiments, a dependency graph may be based on (e.g., generated based on) the information on the at least one application data flow and the dependency information. The method may also include receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus that may include circuitry configured to obtain information on at least one application data flow, and dependency information between one application and at least one other application. According to certain example embodiments, the at least one application data flow may be configured to operate under a quality of service profile, and the at least one other application may be configured to operate under another quality of service profile. According to certain example embodiments, a dependency graph may be based on (e.g., generated based on) the information on the at least one application data flow and the dependency information. The apparatus may also include circuitry configured to receive, from a network, information on an updated quality of service profile for the at least one application, and information on another updated quality of service profile for the at least one other application. According to certain example embodiments, the updated quality of service profile and the another updated quality of service profile may be selected based on the dependency graph.

Certain example embodiments may be directed to a method. The method may include transmitting, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The method may also include transmitting, to the application, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus. The apparatus may include at least one processor and at least one memory storing instructions that, when executed by the at least one processor, cause the apparatus at least to transmit, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The apparatus may also be caused to transmit, to the application, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus. The apparatus may include means for transmitting, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The apparatus may also include means for transmitting, to the application, information on an updated quality of service profile for the at least one application, and information on another updated quality of service profile for the at least one other application. According to certain example embodiments, the updated quality of service profile and the another updated quality of service profile may be selected based on the dependency graph.

In accordance with other example embodiments, a non-transitory computer readable medium may be encoded with instructions that may, when executed in hardware, perform a method. The method may include transmitting, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The method may also include transmitting, to the application, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to a computer program product that performs a method. The method may include transmitting, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The method may also include transmitting, to the application, information on an updated quality of service profile for the at least one application, and information on another updated quality of service profile for the at least one other application. According to certain example embodiments, the updated quality of service profile and the another updated quality of service profile may be selected based on the dependency graph.

Other example embodiments may be directed to an apparatus that may include circuitry configured to transmit, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The apparatus may also include circuitry configured to transmit, to the application, information on an updated quality of service profile for the at least one application, and information on another updated quality of service profile for the at least one other application. According to certain example embodiments, the updated quality of service profile and the another updated quality of service profile may be selected based on the dependency graph.

Certain example embodiments may be directed to a method. The method may include providing information on at least one application data flow for an application to a network. According to certain example embodiments, the at least one application data flow may be configured to operate according to a quality of service profile, and a quality of service degradation of the at least one application data flow may be detected based on the provided information. The method may also include receiving information on an updated quality of service profile for the at least one application data flow. According to certain example embodiments, the updated quality of service profile may be selected based on a dependency graph representing a dependency between the application and at least one other application.

Other example embodiments may be directed to an apparatus. The apparatus may include at least one processor and at least one memory storing instructions that, when executed by the at least one processor, cause the apparatus at least to provide information on at least one application data flow for an application to a network. According to certain example embodiments, the at least one application data flow may be configured to operate according to a quality of service profile, and a quality of service degradation of the at least one application data flow may be detected based on the provided information. The apparatus may also be caused to receive information on an updated quality of service profile for the at least one application data flow. According to certain example embodiments, the updated quality of service profile may be selected based on a dependency graph representing a dependency between the application and at least one other application.

Other example embodiments may be directed to an apparatus. The apparatus may include means for providing information on at least one application data flow for an application to a network. According to certain example embodiments, the at least one application data flow may be configured to operate according to a quality of service profile, and a quality of service degradation of the at least one application data flow may be detected based on the provided information. The apparatus may also include means for receiving information on an updated quality of service profile for the at least one application data flow. According to certain example embodiments, the updated quality of service profile may be selected based on a dependency graph representing a dependency between the application and at least one other application.

In accordance with other example embodiments, a non-transitory computer readable medium may be encoded with instructions that may, when executed in hardware, perform a method. The method may include providing information on at least one application data flow for an application to a network. According to certain example embodiments, the at least one application data flow may be configured to operate according to a quality of service profile, and a quality of service degradation of the at least one application data flow may be detected based on the provided information. The method may also include receiving information on an updated quality of service profile for the at least one application data flow. According to certain example embodiments, the updated quality of service profile may be selected based on a dependency graph representing a dependency between the application and at least one other application.

Other example embodiments may be directed to a computer program product that performs a method. The method may include providing information on at least one application data flow for an application to a network. According to certain example embodiments, the at least one application data flow may be configured to operate according to a quality of service profile, and a quality of service degradation of the at least one application data flow may be detected based on the provided information. The method may also include receiving information on an updated quality of service profile for the at least one application data flow. According to certain example embodiments, the updated quality of service profile may be selected based on a dependency graph representing a dependency between the application and at least one other application.

Other example embodiments may be directed to an apparatus that may include circuitry configured to provide information on at least one application data flow for an application to a network. According to certain example embodiments, the at least one application data flow may be configured to operate according to a quality of service profile, and a quality of service degradation of the at least one application data flow may be detected based on the provided information. The apparatus may also include circuitry configured to receive information on an updated quality of service profile for the at least one application data flow. According to certain example embodiments, the updated quality of service profile may be selected based on a dependency graph representing a dependency between the application and at least one other application.

BRIEF DESCRIPTION OF THE DRAWINGS

For proper understanding of example embodiments, reference should be made to the accompanying drawings, wherein.

DETAILED DESCRIPTION

Figure 1:
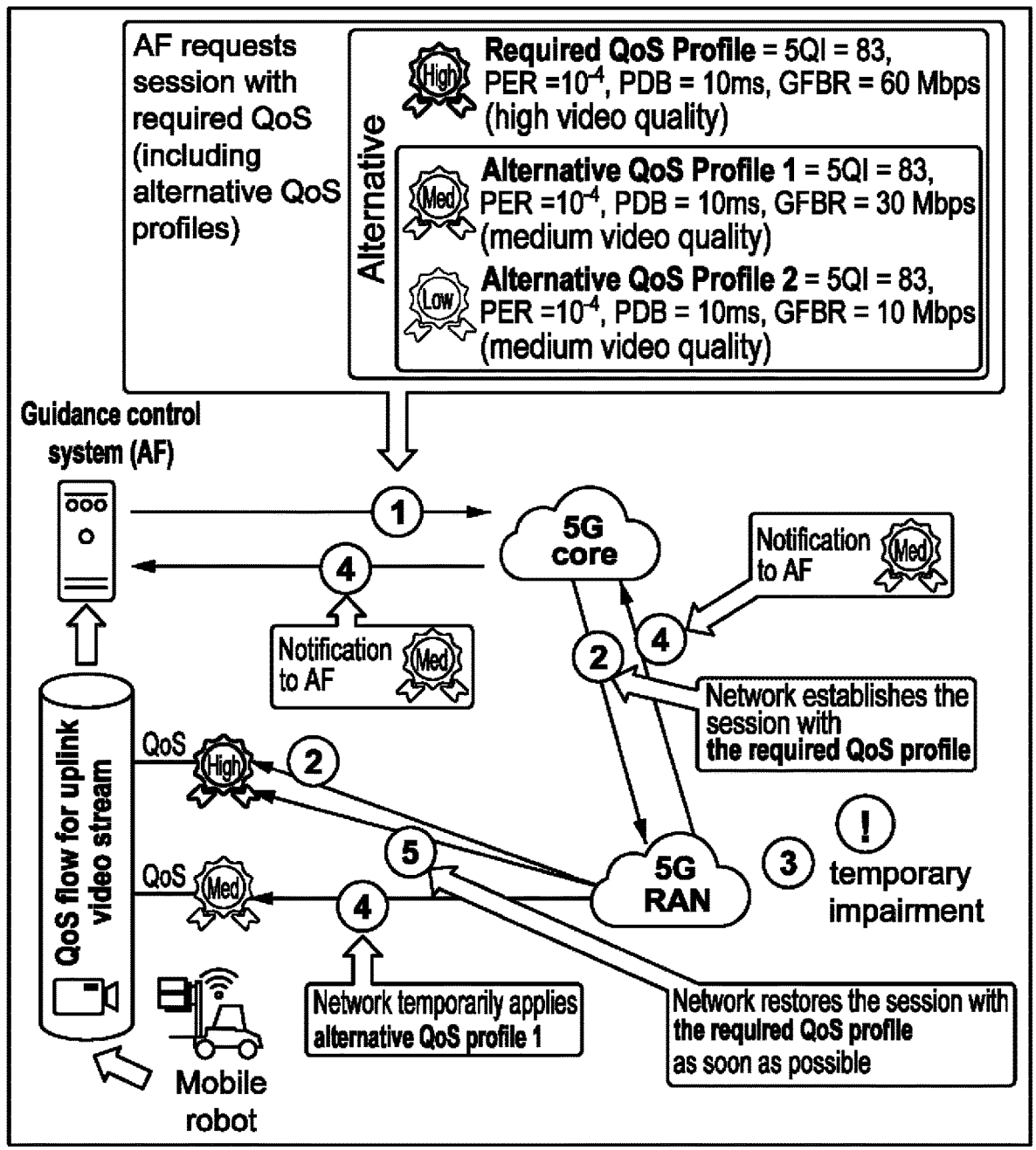
FIG. 1 illustrates various alternative quality of service (QoS) profiles.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for dependency-aware quality of service (QoS) profile provisioning. For instance, certain example embodiments may be directed to dependency-aware QoS profile provisioning for task-oriented scheduling in industrial private wireless networks.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements. As used herein, the expression "and/or" includes any and all combinations of one or more of the listed terms.

As used herein, unless stated explicitly, performing a step "in response to A" does not necessarily indicate that the step is performed immediately after "A" occurs as one or more intervening steps may be included.

Further, the terms "base station", "cell", "node", "gNB", "network" or other similar language throughout this specification may be used interchangeably.

Industrial campus networks (e.g., 5G networks) can be characterized by stringent requirements in terms of latency, throughput, and reliability raised by the industrial applications and use cases. For many of those applications, the correlation between network performance and optimal quality of experience is unclear, as well as how the QoS of each application might impact the overall objective of industrial tasks, such as probability of failures, interruptions, or delays in a production line. As in the consumer world (e.g., video streaming flows), and also in the industrial domain, most of the applications dynamically adapt to network conditions. For example, applications may change their operational mode and request lower throughput or higher latency targets. The adaptive application requirements may be translated in alternative QoS profiles, which may be processed by the network independently for each flow.

FIG. 1 illustrates various alternative QoS profiles by the 5G Alliance for Connected Industries and Automation (5G-ACIA). Alternative QoS profiles may allow adaptations in the face of, for example, radio access network (RAN) conditions degradation. Those adaptations may be defined at the application level and handled at the network level for single flows. However, when considering industrial use cases, there can be a dependency among operations of different devices and the performance of their applications may be correlated (e.g., directly correlated) to each other for the completion of a specific task. Although steps have been taken to adapt the network to the adaptive application configuration, there is currently no notion of dependency among applications and their performance requirements.

In networks that enable alternative QoS profiles, each application can be associated to a list of QoS options, including the preferred QoS class and alternative QoS classes (e.g., that provide lower QoS). Although it may be possible to indicate the priority among the classes per single flow, there may be scenarios where the degradation of a high priority application is preferable than the degradation of multiple flows with lower priority. Moreover, for industrial use cases, there can exist a correlation (e.g., direct correlation) among performance of different applications when all of them contribute for the completion of a specific task. For example, the reduction of performance of a production machine might impact the production rate itself, and so, also the planned trajectory/speed of automated vehicles for transporting the produced items. In general, the performance of each application may be correlated (e.g., directly correlated) to others, and the degradation of one application can cause a cascade of effects that might be avoided if taking a different decision or could lead to a more efficient utilization of network resources. However, such scenarios do not consider dependencies among applications.

To satisfy the diverse requirements of emerging applications, 5G network systems may be able to handle an extended list of QoS classes. In addition, the technical specification of the 3$^{rd}$ Generation Partnership Project (3GPP) have included an option for alternative QoS profiles, which allow the ability to define alternative QoS profiles for applications that are able to adapt to different performance requirements. However, there is still no clear understanding of how the selection of the alternative QoS profiles can impact the network performance, or the overall industrial production efficiency, and how the different applications (with their QoS requirements) can be linked with each other. Given the above challenges, certain example embodiments may provide a solution to expose the dependencies among applications while also considering QoS flow requirements.

According to certain example embodiments, additional information may be provided to the network to guide the network in decisions on the QoS profile selection to be assigned to application data flows (e.g., streams of packets) associated with corresponding task(s). In certain example embodiments, an individual task may be associated with one or more application data flows, where each application data flow is assigned a QoS profile. The additional information may include additional production-related information sent from an operation technology (OT) domain (e.g., application scheduler, system involved in the production processes, tasks, and/or applications) to the network. In certain example embodiments, the additional information may include information on at least one application data flow, and dependency information between one application and at least one other application. The information on a particular application data flow may include information, such as identification information, a relative (e.g., production-related) priority of the given application and/or a targeted completion time of the given task. In certain example embodiments, the targeted completion time of the given task may refer to a targeted completion time of a group of tasks that include the given task. Dependency information may, for example, describe the dependency among various industrial tasks (and the applications within each task). For example, dependency information between a first industrial task and a second industrial task refers to the logic relationship describing how the first task and the second industrial task are related. Provided the additional information, the network may be configured to react to any observed degradation occurring in each flow by changing assigned QoS profiles of dependent tasks. The network may also be configured to assign the higher QoS profiles to application associated to prioritized tasks while optimizing for priority/target completion time/overall network usage.

Figure 2:
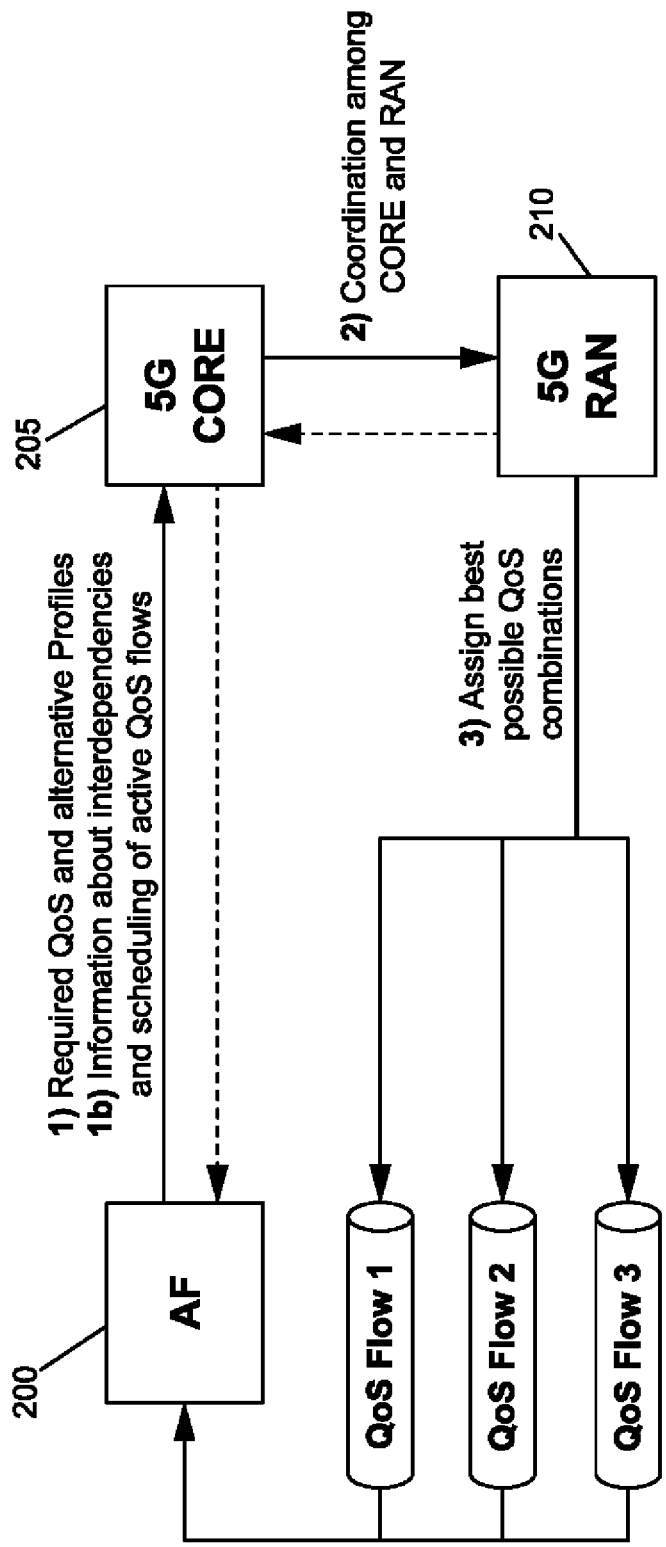
FIG. 2 illustrates an example operational flow for alternative QoS profile selection, according to certain example embodiments.

FIG. 2 illustrates an example of operational flow for alternative QoS profile selection, according to certain example embodiments. In particular, FIG. 2 illustrates the mechanism introduced by the 5G alliance for connected industries and automation (5G ACIA), where each application (to which a specific QoS flow is associated) can specify its required QoS and alternative QoS profiles to the 5G network via an application function (AF) 200. For instance, as illustrated in FIG. 2, the AF 200 may transmit required QoS and alternative profiles to the 5G core 205, along with information about interdependencies and scheduling of active QoS flows. After receiving this information from the AF 200, the 5G core 205 may perform coordination among the core and 5G RAN 210. The 5G RAN 210 may then assign QoS (e.g., the best possible QoS) combinations for various flows, such as QoS flows 1-3. Certain example embodiments may extend the information sent via this channel by including information, such as identification information, information about the task inter-dependency between multiple applications, scheduling and target competition time for each task/group of tasks, and priorities among different tasks/groups of tasks.

Figure 3:
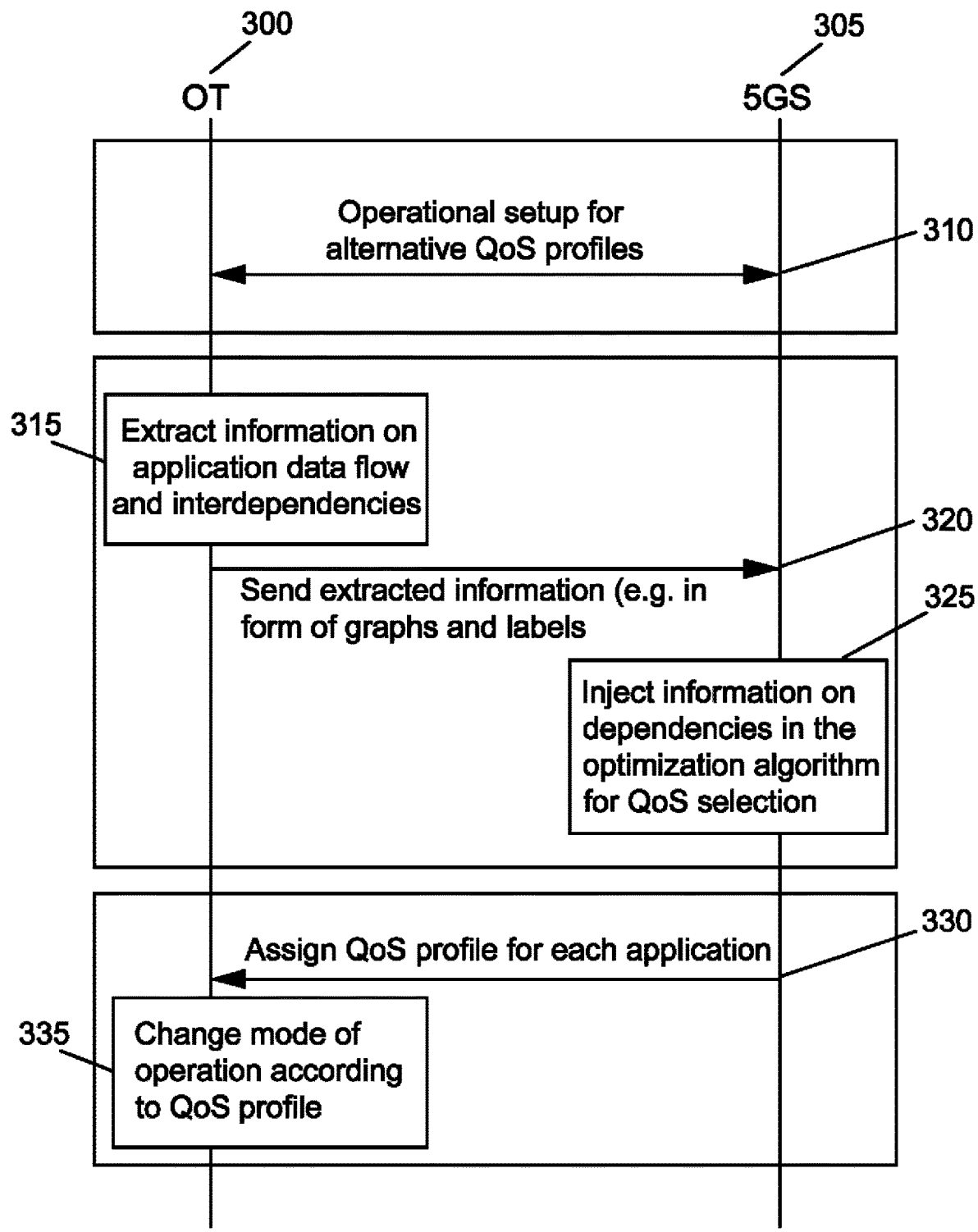
FIG. 3 illustrates an example signal diagram of a message sequence chart (MSC), according to certain example embodiments.

FIG. 3 illustrates an example signal diagram of a message sequence chart (MSC), according to certain example embodiments. As illustrated in FIG. 3, the MSC may include a reference OT 300 and 5GS 305. The reference OT 300 may refer to all the entities belonging to the OT domain that exchange information with the 5GS. In certain example embodiments, the OT applications and OT scheduling components may be example entities involved in the OT operations. The actual implementation of OT applications or production scheduling components may be left to the preference of the OT administrator. The OT administrator may include software components that can reside either at the device side (e.g., any end-user entity that is connected to the RAN) or in the cloud. Certain example embodiments may cover the interaction between the OT components requesting the communication service and the network, independent of where the OT logic is actually implemented.

In FIG. 3, at 310, the 5GS 305 and the OT 300 exchange information about operational setup for alternative profiles.

At 315, the OT 300 extracts information on one or more application data flows along with the information on the interdependencies (e.g., a dependence of the operations/results of one application on the operations/results of another application) between the one or more applications. For instance, in certain example embodiments, an overall task may need to be completed, which may involve more than one application and the overall success, or failure, or completion time may depend on one or more of the involved applications or even all of the involved applications. In certain example embodiments, the OT 300 computes one or more task graphs based on the extracted information. At 320, the OT 300 transmits information to the 5GS 305. In some example embodiments, the information may include the extracted information on the one or more application data flows along with the information on the interdependencies. In other example embodiments, the information may take the form of graphs and labels, such as one or more task graphs (as described with respect to FIG. 4) or one or more QoS dependency graphs (as described with respect to FIG. 5). At 325, the 5GS 305 injects information on the dependencies in an optimization algorithm for QoS selection. At 330, the 5GS 305 assigns a QoS profile for each application. At 335, upon receiving the assigned QoS profile, the OT 300 changes a respective mode of operation for one or more entities of the OT 300 according to their respectively assigned QoS profile.

In certain example embodiments, entities of the OT domain 300 (e.g., machines, applications, AGVs, etc.) can have different operation modes (e.g., energy modes or speed of production for machines, driving speed for the AGVs, video quality resolution for camera based applications). Based on their assigned QoS profile, a mode of operation can be changed for those respective entities.

According to certain example embodiments, for each task graph, the applicable information about its application dependencies and additional information may be obtained. According to some example embodiments, the additional information may include priority information to infer task-oriented production process information. According to other example embodiments, a QoS dependency graph may be constructed, and QoS adaptation of application data flows may be scheduled based on the dependency graph in the face of events such as, for example, an observed RAN degradation.

In certain example embodiments, task-oriented production process information related to one or more operating applications may be inferred. For instance, in some example embodiments, the applicable information for each production application (e.g., applications depending on each production application, applications it depends on, its relative priority, or expected target completion time) may be provided to the network by the operation functions (e.g., under the form of one or several 5G AFs). Alternatively, in other example embodiments, the dependencies may be learned during an observation period where the network observes operation-triggered task throttling to learn these dependencies between the applications to complete the task and the resulting graph. Event-based data management and analysis may, for example, be utilized to detect a flow of sequential or parallel (e.g., concurrent or simultaneous) application processes to accomplish the task.

Figure 4:
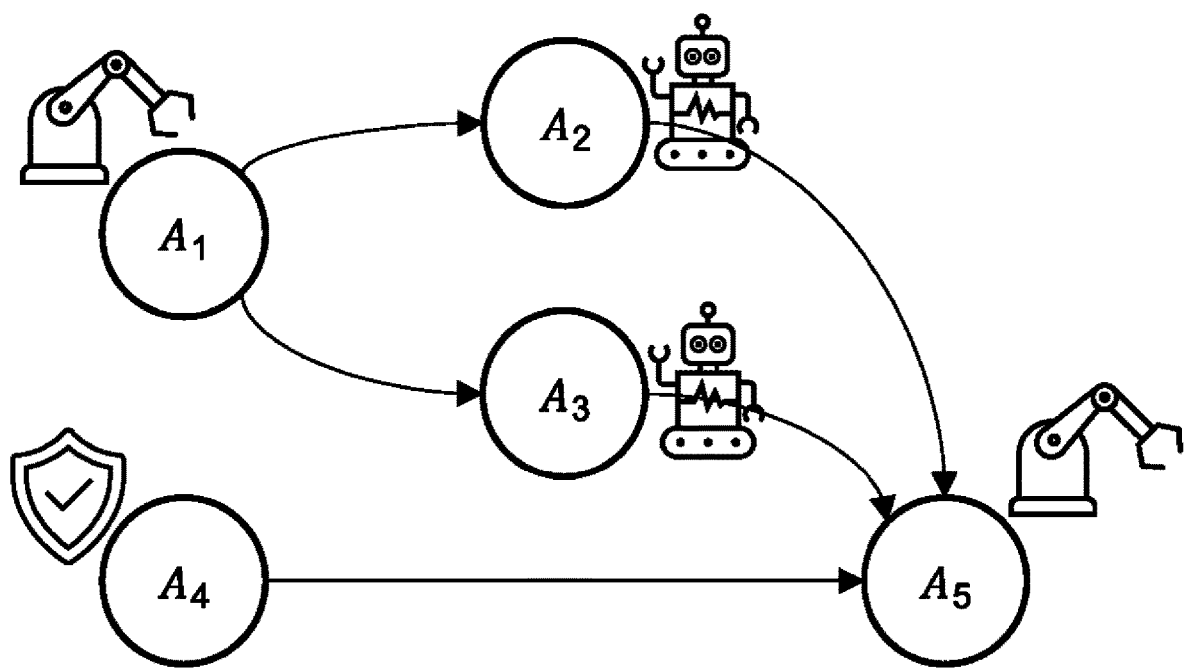
FIG. 4 illustrates an example task graph, according to certain example embodiments.

FIG. 4 illustrates an example of task graph according to certain example embodiments. The task graph may refer to the sequence of different inter-dependent applications, which together constitute a task. As such, a task may be given by several sequential and/or parallel (e.g., concurrent or simultaneous) applications.

For instance, it may be assumed that a task graph where a machine operation application $A_1$ is executed to produce some materials, and the produced materials are to be delivered by two automated guide vehicles (AGVs) running applications $A_2$ and $A_3$, respectively, to the final destination, a machine running application $A_5$. Moreover, to successfully complete the task at $A_5$, a security authorization application $A_4$ may need to be completed first. For instance, in some example embodiments, the security authorization application $A_4$ may include a software update or some firmware to be installed to complete the task at $A_5$. Additionally, as illustrated in FIG. 4, the edges of the task graph may represent operational dependencies between the applications of the tasks; they may or may not correspond to network flows between them.

For the given task graph in FIG. 4, $\tau_i(q_i)$ may be the process time for $A_i$ depending on its achievable QoS $q_i$, and $D_i$ denotes the total required time to complete application $A_i$. The total time to finish the task in application $A_5$ may be given as follows:

$$D_5 = \max\{D_2, D_3, D_4\} + \tau_5$$
$$= \max\{D_1 + \tau_2, D_1 + \tau_3, \tau_4\} + \tau_5.$$
$$= \max\{\tau_1 + \tau_2, \tau_1 + \tau_3, \tau_4\} + \tau_5$$

The above equation means that the total completion time of the task running in application $A_S$ depends on the maximum process time of completing time of $A_2$, $A_3$, and $A_4$. Thus, if $q_1$ degrades, $\tau_1(q_1)$ increases, then, $q_4$ can be also degraded. Additionally, among $q_2$, $q_3$, $q_4$, if any one of them degrades, the other two can be degraded. Thus, if an error or problem occurs at any node, the final task may not be completed. Additionally, the above equation is an example of how the entire task's latency may depend on each application's delay jointly. In this example, some applications cannot be started unless some others are completed. As such, there can be other relationships between the applications within an application process. Interdependency between applications may correspond to how an application's behavior and performance can affect the others, or multiple applications jointly can affect the performance of a task.

Figure 5:
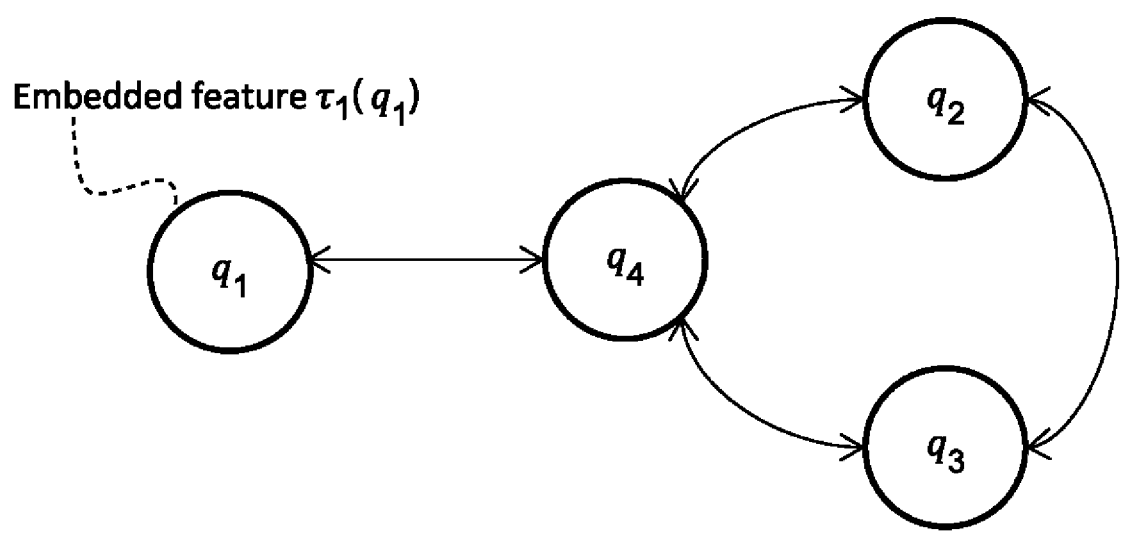
FIG. 5 illustrates an example application QoS dependency graph based on the task graph of FIG. 4, according to certain example embodiments.

FIG. 5 illustrates an example application QoS dependency graph based on the task graph of FIG. 4, according to certain example embodiments. Based on the example of FIG. 4, the application QoS dependency graph (e.g., also referred to as "dependency graph") in FIG. 5 can be generated. Namely, for every given pair of applications that run in parallel in FIG. 4 (e.g., that are independent with each other), there is a corresponding arrow in FIG. 5. In this case, $A_1$ runs in parallel to $A_4$, which runs in parallel also to $A_2$ and $A_3$, which run in parallel also with each other. Therefore, FIG. 5 illustrates a corresponding network logic that correlates the QoS (q) of one application to another. As such, what happens to QoS at $A_1$ ($q_1$) can affect the application at $q_4$. Thus, the dependency among the applications can be linked to the QoS dependencies; hence linked to the QoS adaptation of one application with respect to the performance of another application. In certain example embodiments, the feature of the application's process time may be embedded depending on QoS in the nodes, such that the quantified relationship between the applications is obtained. For example, if $q_1$ is degraded to $q_1' < q_1$, then, $q_4$ can be degraded to $q_4'$ with the following constraint:

$$q_4' \geq \tau_4^{-1}(\tau_4(q_4) + \tau_1(q_1') - \tau_1(q_1)),$$

where $\tau_4^{-1}(\bullet)$ denotes the inverse function of $\tau_4(\bullet)$, projecting the process time back to the required QoS.

The examples of FIGS. 4 and 5 illustrates how to generate and leverage a dependency graph of a task.

With reference to FIG. 4, the dependency graph may comprise of a set of nodes and edges (e.g., lines, arrows). Each node may, for example, describe an application via its respective attributes. Each edge may, for example, represent a logical relationship among associated applications. For example, the completion of first application may serve as an input (e.g., for the start) of a second application. In the dependency graph, this logical relationship may be represented by an arrow originating at a node representing the first application and terminating at a node representing the second application.

By way of comparison, the QoS dependency graph of FIG. 5 can also comprise a set of nodes and edges (e.g., lines, arrows). However, each node may describe a QoS (q) via its respective attributes. Each edge may, for example, represent a logical relationship among two or more associated QoS (e.g., $q_2$ and $q_3$).

Information may, for example, be extracted or derived from the task graph illustrated in FIG. 4 and/or QoS dependency graph in FIG. 5. In the graph of FIG. 4, the nodes represent the applications, and the edges represent the relationship between the applications. If there is an arrow connecting two applications (e.g., as in FIG. 4), it means that the output of one application is utilized as input for the other application. This logical relationship between these applications may, for example, be extracted and expressed as dependency information. While for FIG. 5, if there is a link between associated QoSs, it means that if any of the associated QoS degrade, then all of the QoS profiles connected to it can be degraded as well. This logical relationship between these QoSs may, for example, be extracted and expressed as dependency information. The attributes for each node may include the information, such as identification information, QoS information, relative priorities, task completion time, and other design constraints. Therefore, information on any application/node may be extracted from its respective attributes.

Figure 6:
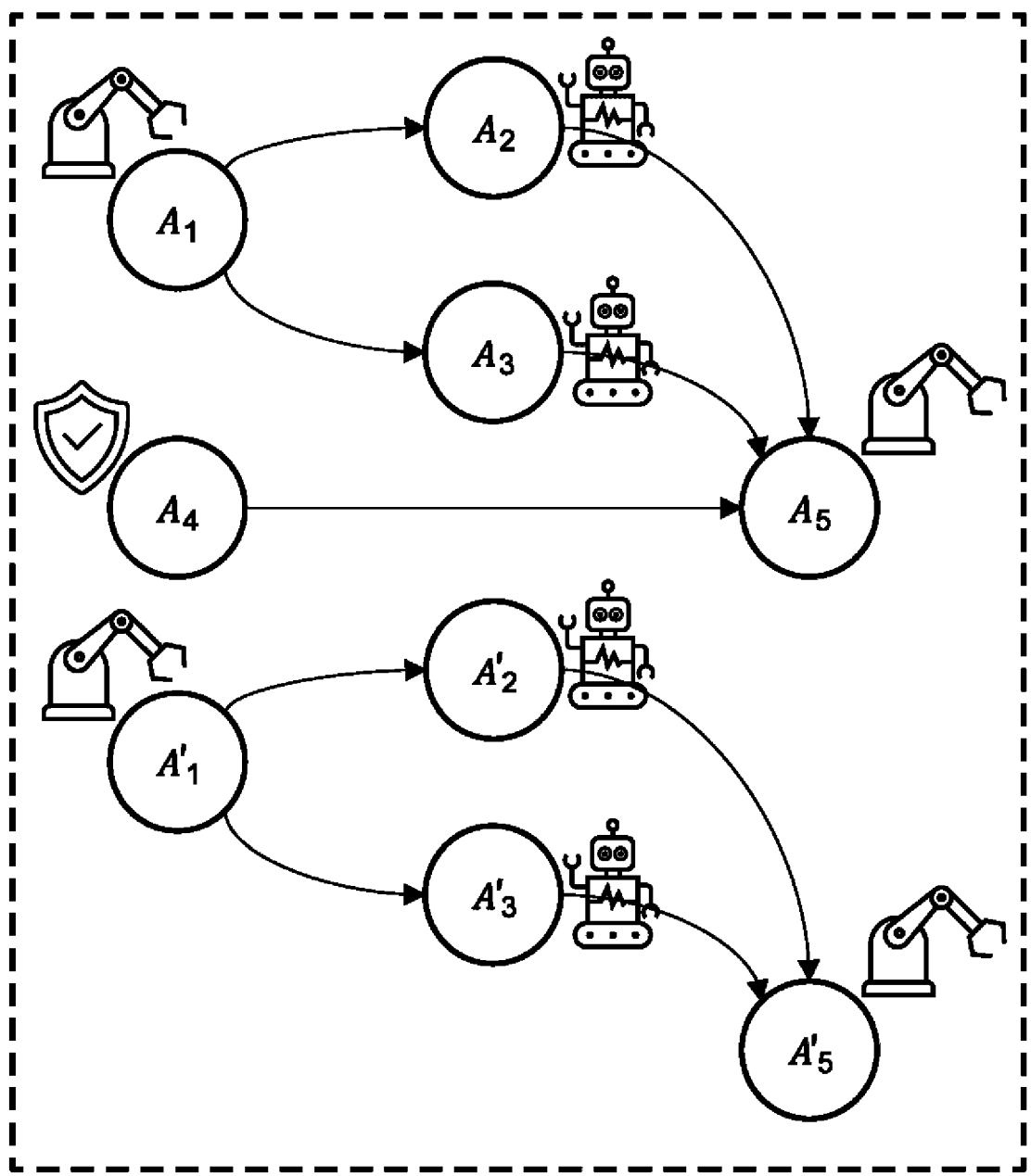
FIG. 6 illustrates an example factory setting with two concurrent task graphs, according to certain example embodiments.

FIG. 6 illustrates an example factory setting with two concurrent task graphs, according to certain example embodiments. As illustrated in FIG. 6, on a given factory floor, for example, multiple sets of dependent applications may form concurrent task-oriented graphs for which any application from one given task/graph (e.g., $A_1$, $A_2$, $A_3$, and $A_4$) may be independent from any application from any other task/graph (e.g., $A'_1$, $A'_2$, $A'_3$, and $A'_4$) while an overall network resource dependency may exist for all (e.g., overall network capacity available in terms of bandwidth or latency budget).

In the example of FIG. 6, scheduling may take into account this overall dependency on the network resource to decide to adjust/optimize QoS profiles of all tasks on the factory floor based on application dependencies and relative priority or target time to completion information, and/or based on optimizing the overall network resource consumption. Information on optimizing the overall network resource consumption may be network-centric (e.g., not known from the operational side). By taking into account the overall dependency on the network resource, it may be possible to react to observed dynamic changes at any application. For instance, the observed dynamic changes may include a QoS degradation for a given application data flow or possibly operation-driven changes in an application priority/time to completion. For example, in FIG. 6, $A'_4$ time to completion maybe updated to "first/asap", leading the scheduler to boost its QoS as well as the QoS of all its dependent $A'_{1\_3}$ tasks. Given the overall network resource budget, this may involve lowering $A_1$-$A_5$ QoS profiles according to their dependencies.

As described above, inferring task-oriented production flows and generating QoS dependency graphs may provide applicable information for alternative QoS profile selection, as well as for other task-/goal-oriented network optimization functions. As described herein, the methodology of certain example embodiments may also be applied to dependency graphs of Quality of Experience (QoE) of each OT application, provided that a means to access end-to-end (E2E) QoE is available for each AF outside or within the evolved 5GS/6GS.

According to certain example embodiments, an OT scheduling component (e.g., applications and/or app scheduler) may be responsible for producing the dependency graph based on operational knowledge, and drive the 5GS by scheduling QoS adaptation requests upon notifications, acting as an AF. This example embodiment may relates to standard 5GS mechanisms, but does not allow for production-oriented network resource usage optimization. The app scheduler may be an AF to the 5GS which proxies other OT applications, requesting QoS to the 5G Core on their behalf (via network exposure function (NEF), for example, using Nnef_AFsessionWithQoS service operation or directly to PCF using Npcf_PolicyAuthorization), receiving QoS degradation notifications from the 5GS, and making decisions on new QoS while keeping the OT applications informed of their respective current status.

Alternatively, in other example embodiments, the app scheduler may be solely within the OT domain and orchestrate OT applications, which are each AFs in their own rights. This may involve signalling between the app scheduler and each OT application to instruct AFs of the QoS profile to request upon notifications of changes. Another alternative may be to not rely on any "centralized" graph handling component (e.g., no dedicated app scheduler), but have the graph distributed among the OT application. In this case, each application may be configured to obtain relevant dependency information and subscribe to updates from application(s) it depends on. Alternatively, in other example embodiments, each application may be internally configured (e.g., pre-loaded) with relevant dependency information and subscribe to updates from application(s) it depends on.

Certain example embodiments may relieve the 5GS of extraneous tasks, typically in case the graph needs to be updated often (based on industrial processes evolution over time). Certain example embodiments may also put less stress/overhead on the network by leaving this update to the OT domain and the network AFs just execute the changes.

Figure 7:
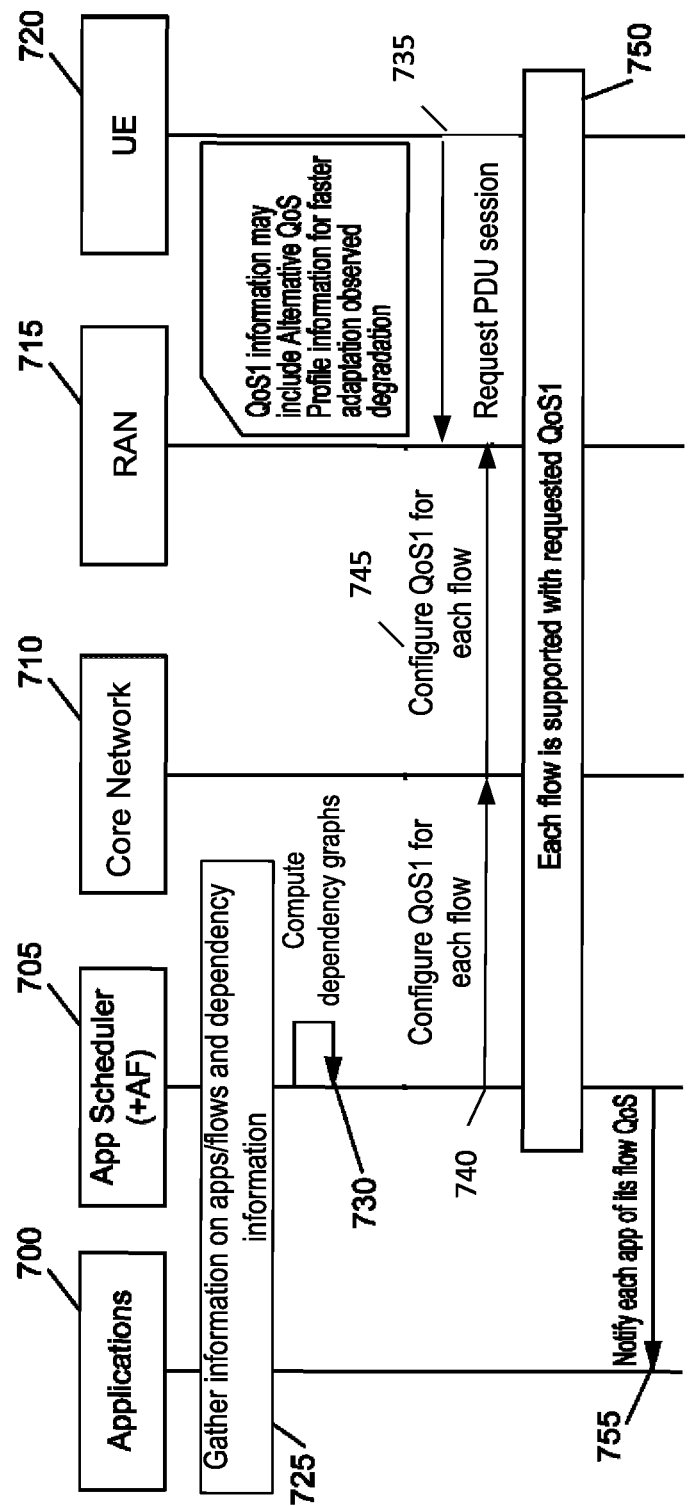
FIG. 7 illustrates an example signal flow diagram of dependency graph generation and initial QoS assignment, according to certain example embodiments.

FIG. 7 illustrates an example signal flow diagram of dependency graph generation and initial QoS assignment, according to certain example embodiments. As illustrated in FIG. 7, the signal flow diagram may include applications 700, an app scheduler (+AF) 705, core network 710, RAN 715, and a user equipment (UE) 720. At 725, the application 700 and/or app scheduler (+AF) 705 gathers information on the various applications and flows (e.g., identification information, QoS information, relative priorities, task completion time, and other design constraints) as well as dependency information of the various applications and flows. For instance, in some example embodiments, the dependency information may relate to an industrial use case of the various applications. As previously discussed, the dependency information may correspond to the task graph illustrated in FIG. 4 and/or QoS dependency graph in FIG. 5. At 730, the app scheduler (+AF) 705 computes dependency graphs based on the gathered information from 725. In some example embodiments, information may be extracted or derived from the gathered information from 725 to generate a dependency graph. For example, each node of a dependency graph may be generated based on identification information of a respective application (e.g., as in FIG. 4) or a respective QoS (e.g., as in FIG. 5). Attributes of each node in the dependency graph may be generated based on the information on the various applications and flows. Edges may be generated based on the logical relationships between at least two applications (e.g., as in FIG. 4) or at least two QoS (e.g., as in FIG. 5). At 735, the UE 720 transmits a protocol data unit (PDU) session request to the RAN 715. At 740, the app scheduler (+AF) 705 transmits a request for QoS1 (e.g., a QoS profile) for each flow to the core network 710. At 745, the core network 710 configures QoS1 for each flow, and transmits the configuration to the RAN 715. In certain example embodiments, QoS1 information may include alternative QoS profile information for improved adaptation (e.g., efficient adaptation) in view of an observed degradation in of QoS at an application. At 750, each flow is supported with the requested QoS1. Operation 750 represents the session establishment between the network and the UE with the agreed QoS (e.g., for a PDU session). At 755, the app scheduler (+AF) 705 notifies the application(s) 700 of its current applied QoS profile.

Figure 8:
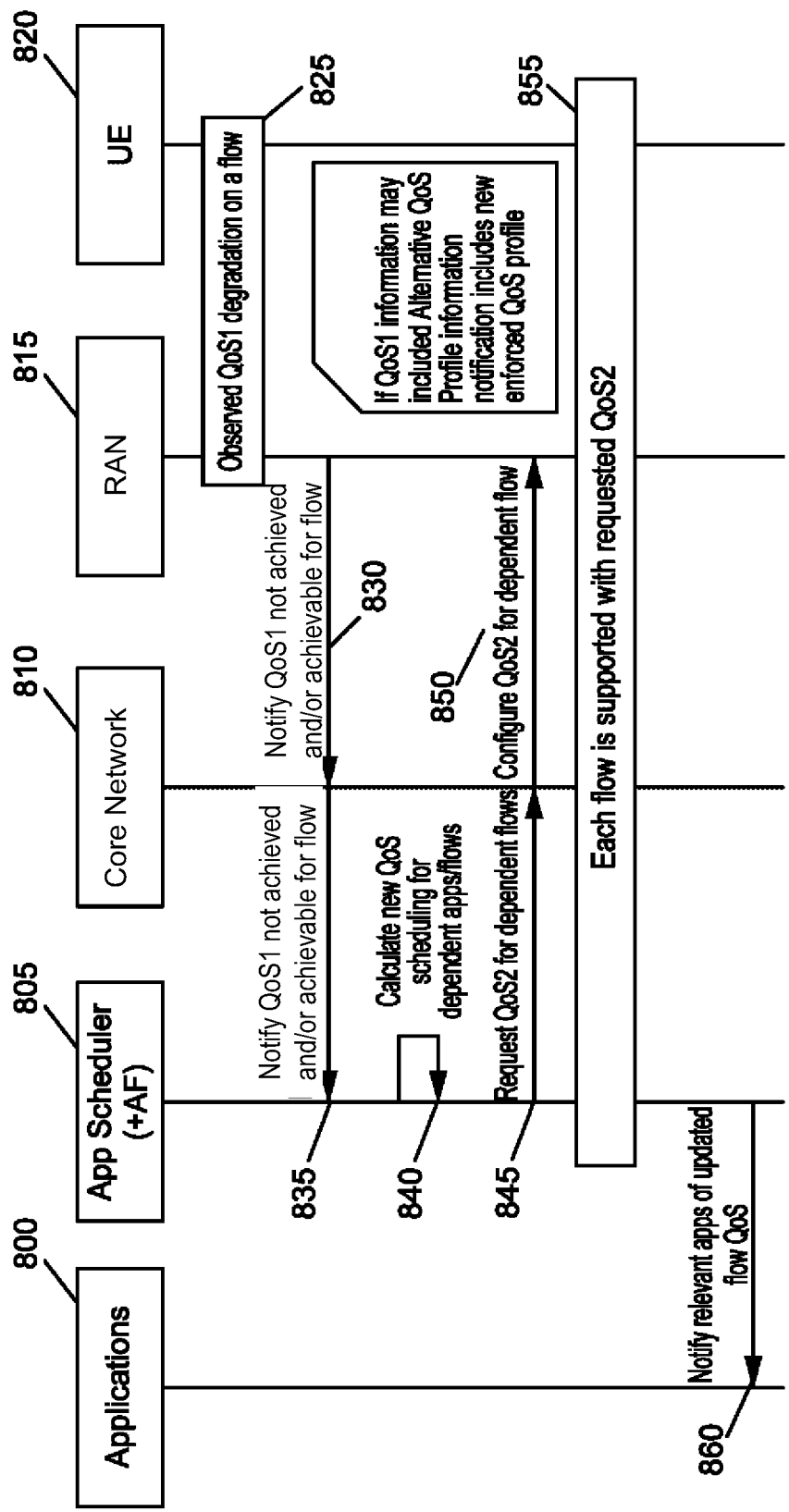
FIG. 8 illustrates an example signal flow diagram of QoS adaptation, according to certain example embodiments.

FIG. 8 illustrates an example signal flow diagram of QoS adaptation, according to certain example embodiments. As illustrated in FIG. 8, the signal flow diagram may include applications 800, an app scheduler (+AF) 805, core network 810, RAN 815, and UE 820. At 825, the RAN 815 observes QoS degradation on a flow occurring at the UE 820. According to certain example embodiments, if QoS1 information includes alternative QoS profile information, a notification may include a new enforced QoS profile. For example, the network can automatically detect degradation of QoS1 and adapt to QoS2, if this information is given or to degrade to any QoS class. When this occurs, the network may notify the app scheduler (+AF) 805 of the degradation. At 830, the RAN 815 notifies the core network 810 of QoS1 not achieved and/or achievable for the flow. At 835, the core network 810 notifies the app scheduler (+AF) 805 that QoS1 is not achieved and/or achievable for the flow. At 840, the app scheduler (+AF) 805 calculates a new QoS scheduling for dependent applications of the affected flow. At 845, the app scheduler (+AF) 805 transmits a request to the core network 810 for QoS2 (e.g., new QoS; updated QoS profile) for the dependent flows. At 850, the core network 810 configures QoS2 for the dependent flow, and transmits the configuration to the RAN 815. At 855, flows for the dependent applications are operating at QoS2. At 860, the app scheduler (+AF) 805 notifies the applications 800 of the updated QoS profile.

In other example embodiments, the OT scheduling component may provide the dependency graph and related information to the 5GS. For instance, in some example embodiments, the dependency graph and related information may be provided to the 5GS through a network exposure function (NEF) by, for example, provisioning (extended) policy and charging control (PCC) rules. The policy charging function (PCF) and session management function (SMF)

may be responsible for scheduling QoS flows based on evaluation of these rules. When a degradation occurs on one flow and is notified back to the SMF from the RAN, the SMF/PCF may use this information to change the respective QoS profiles of multiple dependent flows to support the behavior described above. Alternatively, in other example embodiments, the dependency information may be transferred to the unified data repository (UDR) extended with adequate logic, which may store it and be notified by the PCF that RAN changed the profile of a flow. The UDR may also trigger relevant PCF(s) of dependent flows to update.

Figure 9:
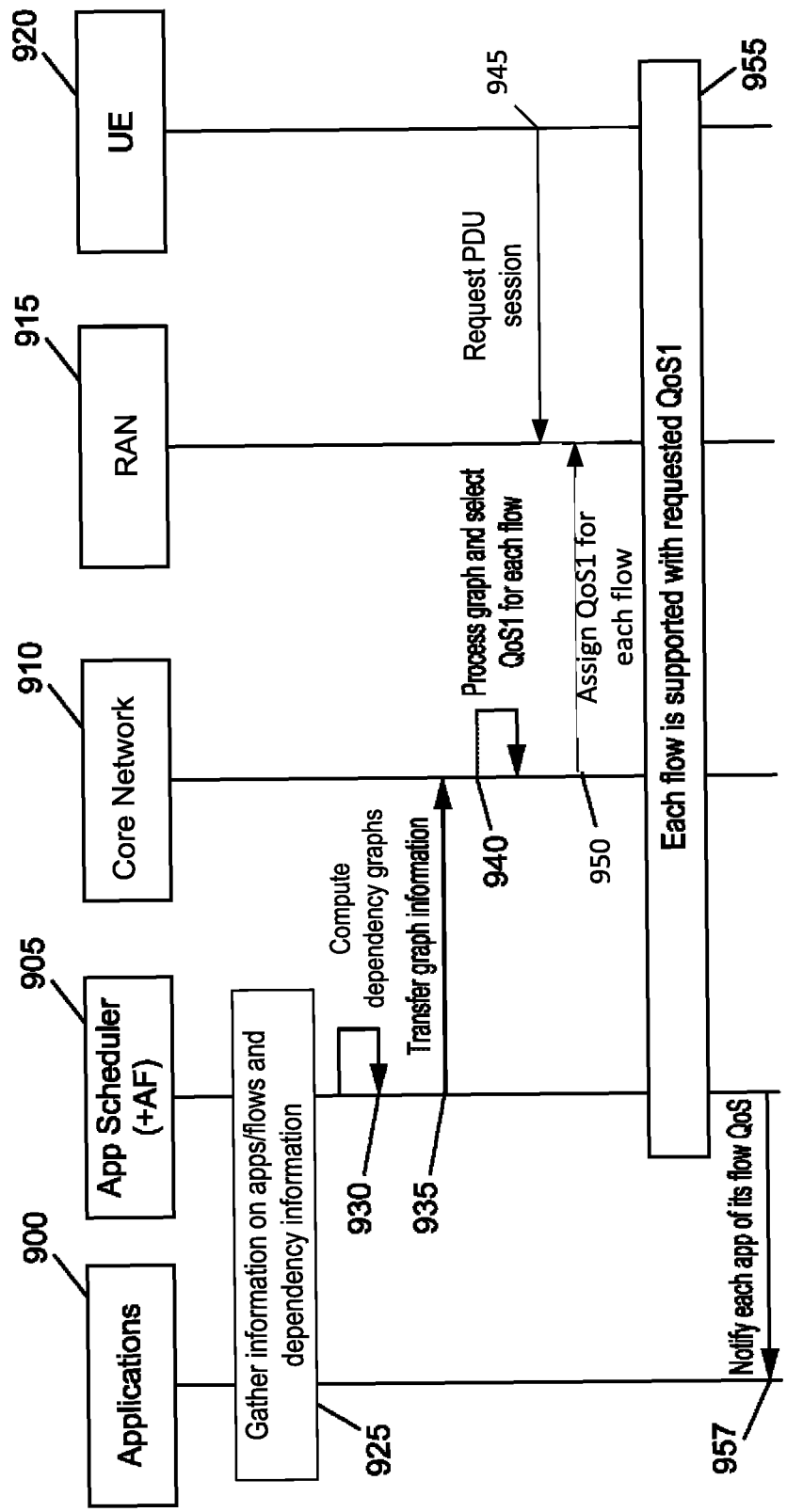
FIG. 9 illustrates an example signal flow diagram of another dependency graph generation and initial QoS assignment, according to certain example embodiments.

FIG. 9 illustrates an example signal flow diagram of another dependency graph generation and initial QoS assignment, according to certain example embodiments. As illustrated in FIG. 9, the signal flow diagram may include applications 900, an app scheduler (+AF) 905, core network 910, RAN 915, and UE 920. At 925, the applications 900 and/or app scheduler (+AF) 905 gathers information on the various applications and flow (e.g., identification information, QoS information, relative priorities, task completion time, and other design constraints) as well as dependency information of the various applications and flows. For instance, in some example embodiments, the dependency information may relate to an industrial use case of the various applications. As previously discussed, the dependency information may correspond to the task graph illustrated in FIG. 4 and/or QoS dependency graph in FIG. 5. For instance, dependency information of various applications (e.g., A1 knows that it is dependent upon A2) can be gathered from the applications themselves. At 930, the app scheduler (+AF) 905 computes dependency graphs based on the gathered information from 925. This process may utilize the same or similar techniques to that described in 730 of FIG. 7. At 935, the app scheduler (+AF) 905 transfers the graph information to the core network 910. At 940, the core network 910 processes the graph information, and selects QoS1 for each flow in the QoS dependency graph. At 945, the UE 920 transmits a PDU session request to the RAN 915. At 950, the core network 910 assigns QoS1 for each flow. At 955, each flow is supported with the requested QoS1. Operation 955 represents the session establishment between the network and the UE with the agreed QoS (e.g., for a PDU session). At 957, the app scheduler (+AF) 905 notifies the applications 900 of each of their respective currently applied QoS profile.

Figure 10:
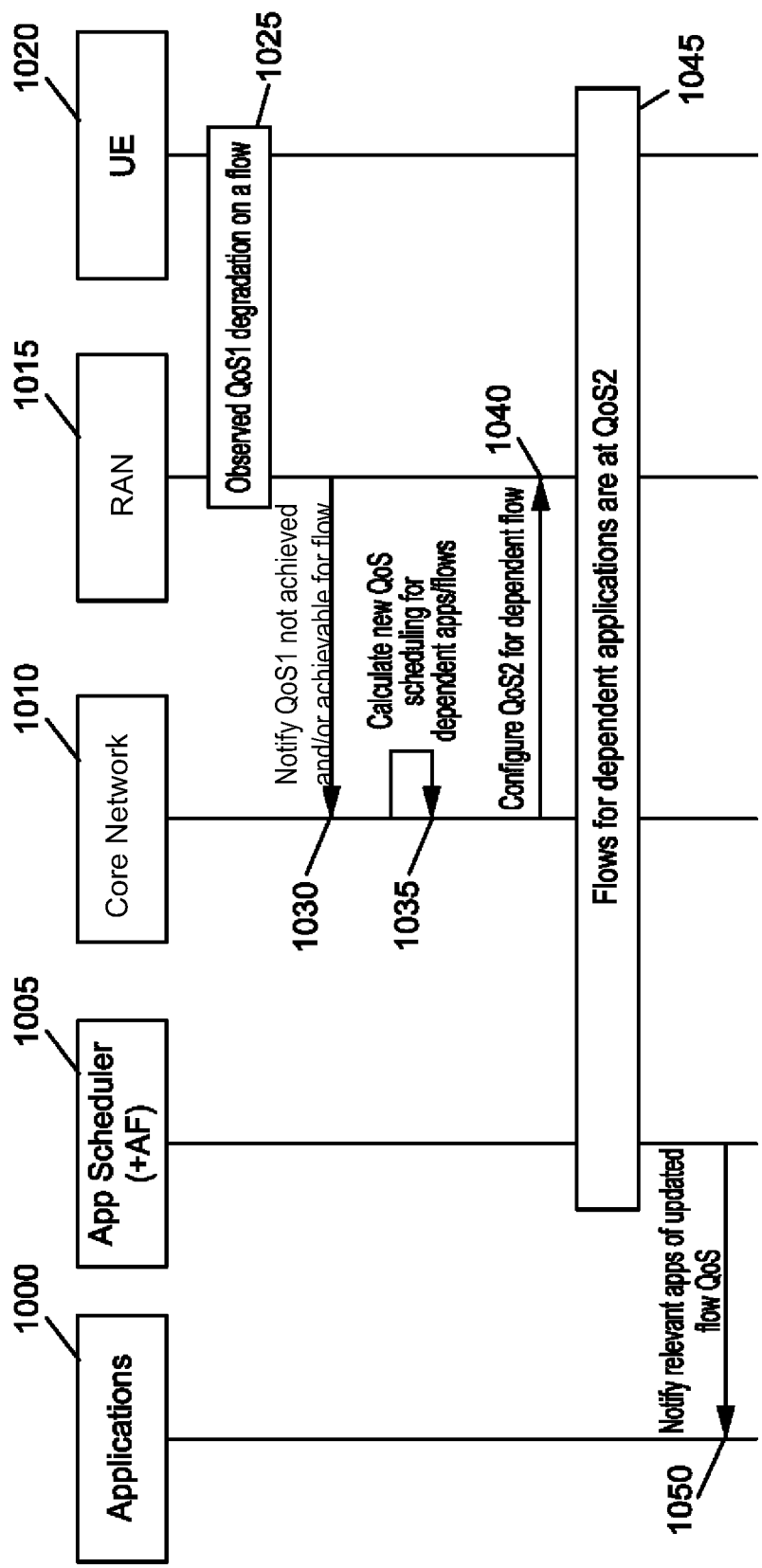
FIG. 10 illustrates an example signal flow diagram of another QoS adaptation, according to certain example embodiments.

FIG. 10 illustrates an example signal flow diagram of another QoS adaptation, according to certain example embodiments. As illustrated in FIG. 10, the signal flow diagram may include applications 1000, an app scheduler (+AF) 1005, core network 1010, RAN 1015, and UE 1020. At 1025, the RAN 1015 observes QoS1 degradation on a flow occurring at the UE 1020. At 1030, the RAN 1015 notifies the core network 1010 of QoS1 not achieved and/or achievable for the flow. At 1035, the core network 1010 calculates a new QoS scheduling for dependent applications or flows. At 1040, the core network 1010 configures QoS2 for the dependent flows, and transmits the configuration to the RAN 1015. At 1045, the flows for dependent applications are operating at QoS2. Operation 1045 represents the session establishment between the network and the UE with the agreed QoS (e.g., for a PDU session). At 1050, the app scheduler (+AF) 1005 notifies the applications 1000 of relevant applications of the updated QoS profile.

According to certain example embodiments, each OT application may also be an AF, and may communicate its own requirement(s) in terms of alternative QoS profile and dependency information to the 5GS (typically through NEF). The core network may be augmented with the capability to reconstruct the dependency graphs (e.g., at UDR) and support the adaptive scheduling based on this information (e.g., the alternative QoS profile and the dependency information).

Figure 11:
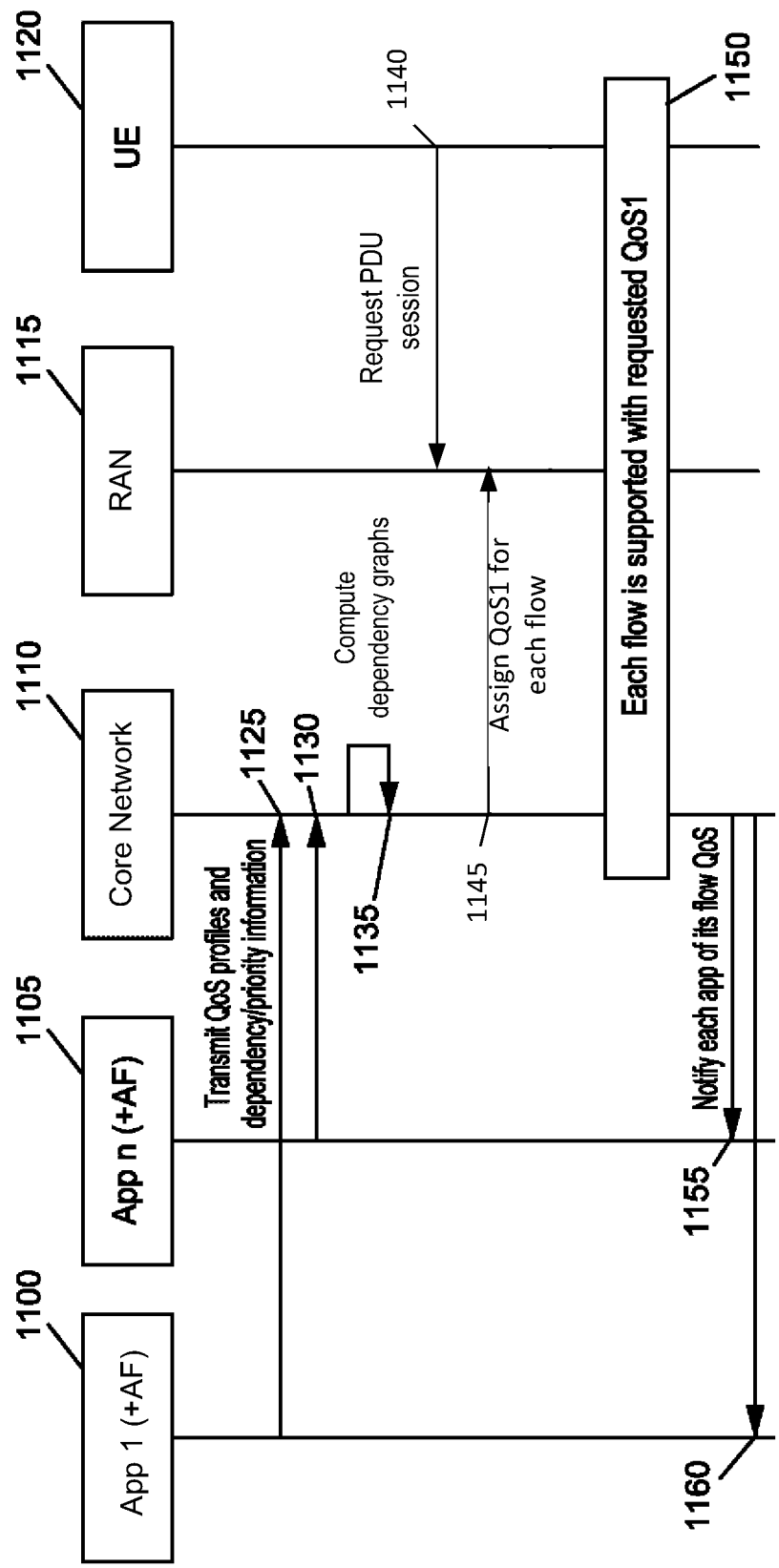
FIG. 11 illustrates an example signal flow diagram of a further dependency graph generation and initial QoS assignment, according to certain example embodiments.

FIG. 11 illustrates an example signal flow diagram of a further dependency graph generation and initial QoS assignment, according to certain example embodiments. As illustrated in FIG. 11, the signal flow diagram may include app 1 (+AF) 1100, app n (+AF) 1105, core network 1110, RAN 1115, and UE 1120. At 1125 and 1130, app 1 (+AF) 1100 and app n (+AF) 1105 transmits their respective QoS profiles and dependency/priority information to the core network 1110. At 1135, the core network 1110 computes dependency graphs based on the dependency/priority information received from app 1 (+AF) 1100 and app n (+AF) 1105. This process may utilize the same or similar techniques to that described in 730 of FIG. 7. At 1140, the UE 1120 transmits a PDU session request to the RAN 1115. At 1145, the core network 1110 selects and requests the RAN 1115 for QoS1 for each flow. At 1150, each flow is supported with the requested QoS1. At 1155 and 1160, the core network 1110 notifies app n (+AF) 1105 and app 1 (+AF) 1100 of its current applied QoS profile.

Figure 12:
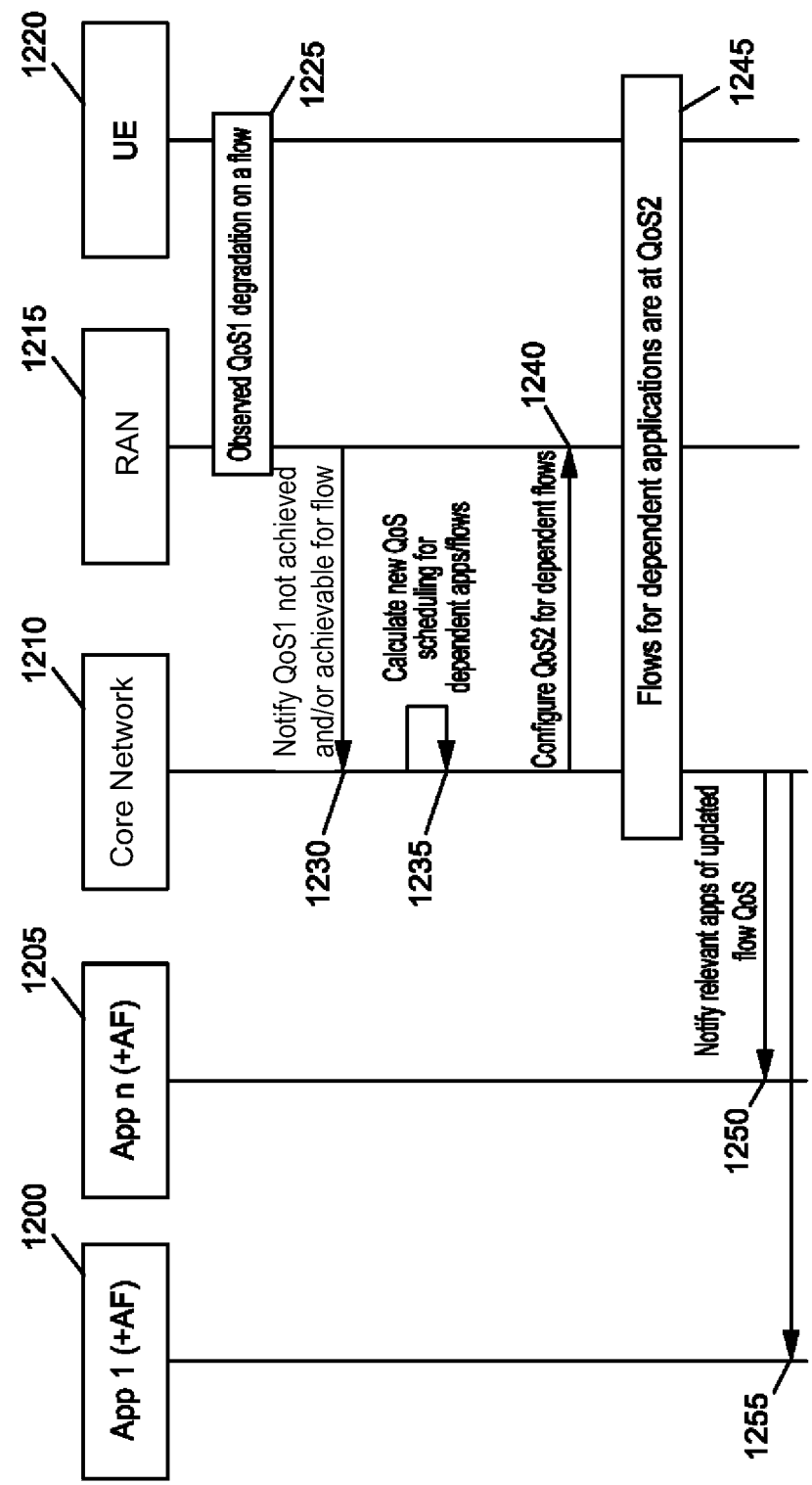
FIG. 12 illustrates an example signal flow diagram of a further QoS adaptation, according to certain example embodiments.

FIG. 12 illustrates an example signal flow diagram of a further QoS adaptation, according to certain example embodiments. As illustrated in FIG. 12, the signal flow diagram may include app 1 (+AF) 1200, app n (+AF) 1205, core network 1210, RAN 1215, and UE 1220. At 1225, the RAN 1215 observes QoS1 degradation on a flow occurring at the UE 1220. At 1230, the RAN 1215 notifies the core network 1210 of QoS1 not achieved and/or achievable for the flow. At 1235, the core network 1210 calculates a new QoS scheduling for the dependent applications or flows. At 1240, the core network 1210 configures QoS2 for the dependent flows, and transmits the configuration to the RAN 1215. At 1245, flows for dependent applications are at QoS2. Operation 1245 represents the session establishment between the network and the UE with the agree QoS (e.g., PDU session). At 1250 and 1255, the core network 1210 notifies app n (+AF) 1205 and app 1 (+AF) 1200 of their flow QoS profile.

In other example embodiments, each OT application may communicate (e.g., to the 5GS via the AFs) its alternative QoS profiles, and the 5GS is augmented with the capability to determine (e.g., based on receipt of one or more indications) whether it should be in learning or runtime mode besides the functions of illustrated in FIGS. 11 and 12. The app scheduler may trigger the learning phase throughout which it assigns (e.g., through human operator intervention) QoS profiles for each application to request to the 5GS through their AF. When a degradation occurs, this is notified back to the applications, which in turn inform the scheduler. The latter assigns a new QoS Profile to a subset of applications (e.g. through human operator intervention based on operational knowledge) which in turn requests the updated QoS profiles to 5GS. Over time, concurrent adjustments to QoS profiles of each application may allow the 5GS to learn the dependency graph. When the scheduler triggers the end of the learning phase, the dependency graph may be fully inferred (e.g., initial steps of previously described example embodiments would not be needed) within the core network and ready to be used as in FIGS. 11 and 12.

Figure 13:
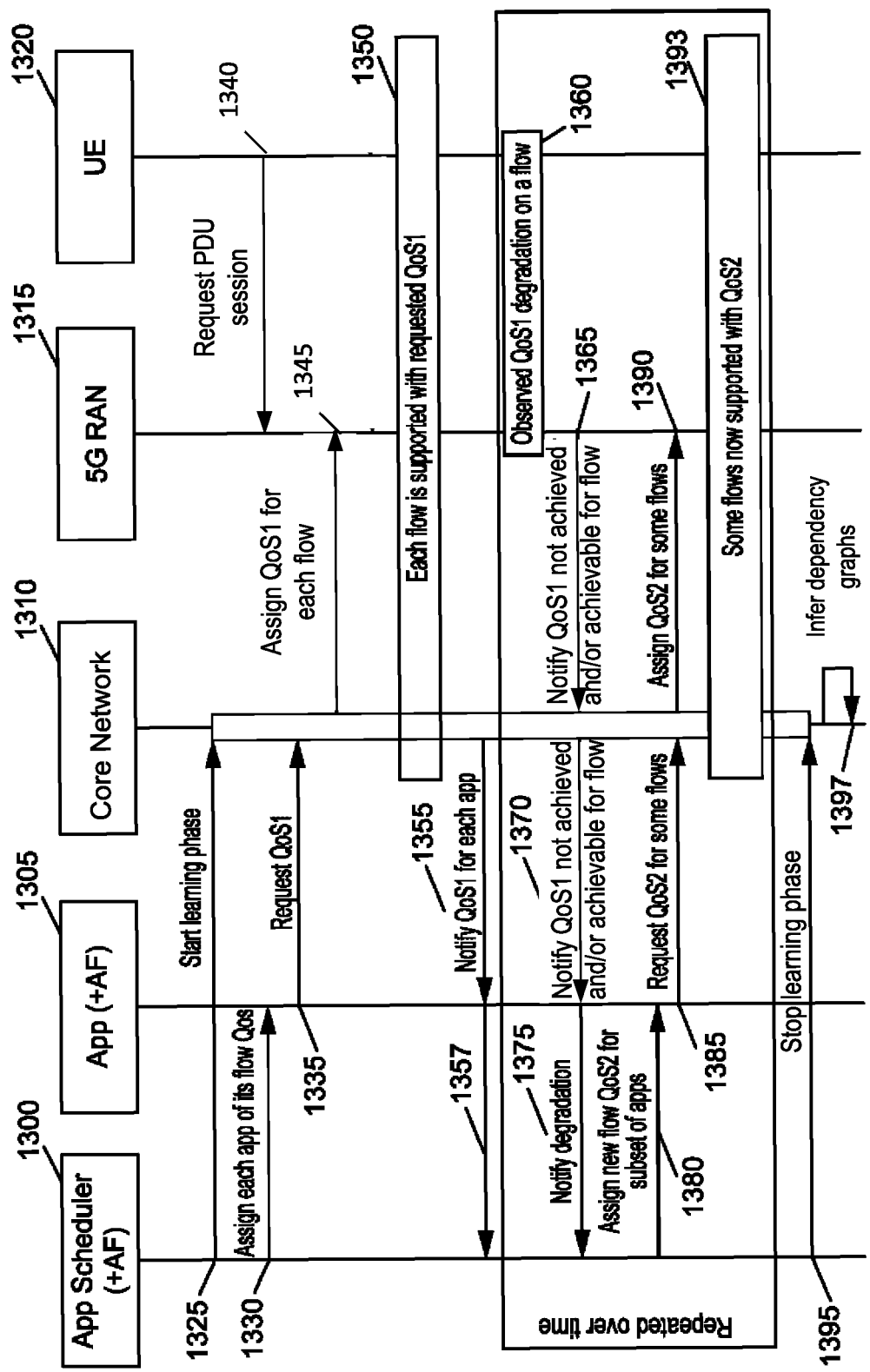
FIG. 13 illustrates an example signal flow diagram of a learning phase, according to certain example embodiments.

FIG. 13 illustrates an example signal flow diagram of a learning phase, according to certain example embodiments. As illustrated in FIG. 13, the signal flow diagram may include app scheduler (+AF) 1300, app (+AF) 1305, core network 1310, RAN 1315, and UE 1320. At 1325, the app scheduler (+AF) 1300 triggers the core network 1310 to start the learning phase. At 1330, the app scheduler (+AF) 1300 assigns each application its own flow QoS. At 1335, the app (+AF) 1305 requests the core network 1310 for QoS1. At 1340, the UE 1320 requests a PDU session to the RAN 1315. At 1345, the core network 1310 assigns QoS1 for each flow, and transmits this information to the RAN 1315. At 1350, each flow in the in the dependency graph to be learnt is supported with the requested QoS1. At 1355, the core network 1310 notifies app (+AF) 1305 of QoS1 for each application in the dependency graph to be learnt, and at 1357, the app (+AF) 1305 forwards the notification it receives to the app scheduler (+AF) 1300.

At 1360, the RAN 1315 observes QoS1 degradation on a flow occurring at the UE 1320. At 1365, the RAN 1315 notifies the core network 1310 that QoS1 is not achieved and/or achievable for the flow. At 1370, the core network 1310 notifies the app (+AF) 1305 that QoS1 is not achieved and/or achievable for the flow. At 1375, the app (+AF) 1305 notifies the app scheduler 1300 about the degradation of QoS1. At 1380, the app scheduler (+AF) 1300 assigns a new flow QoS2 for one or more applications. For instance, in some example embodiments, app scheduler (+AF) 1300 may assign a new flow QoS2 for a subset of applications. At 1385, the app (+AF) 1305 requests the core network 1310 for QoS2 for some flows (e.g., all flows that are affected by the degradation of the first degraded flow). At 1390, the core network 1310 assigns QoS2 for some of the flows. At 1393, some of the flows are supported with QoS2 of applications. At 1395, the app scheduler (+AF) 1300 triggers the core network 1310 to end the learning phase. At 1397, the core network 1310 infers the dependency graphs using previously received information.

In certain example embodiments, besides their described use above, the actual functions for inferring task-oriented production flows and generating QoS dependency graphs may be exposed as a service for reuse by the OT side for further operational management and optimization purposes. In example embodiments of FIGS. 7-10, this can be realized by enriching the app scheduler component to expose an application programing interface (API) to the OT side and standardizing its interactions with the OT Applications. In the example embodiments of FIGS. 11-13, this may be realized by exposing additional services through NEF.

Figure 14:
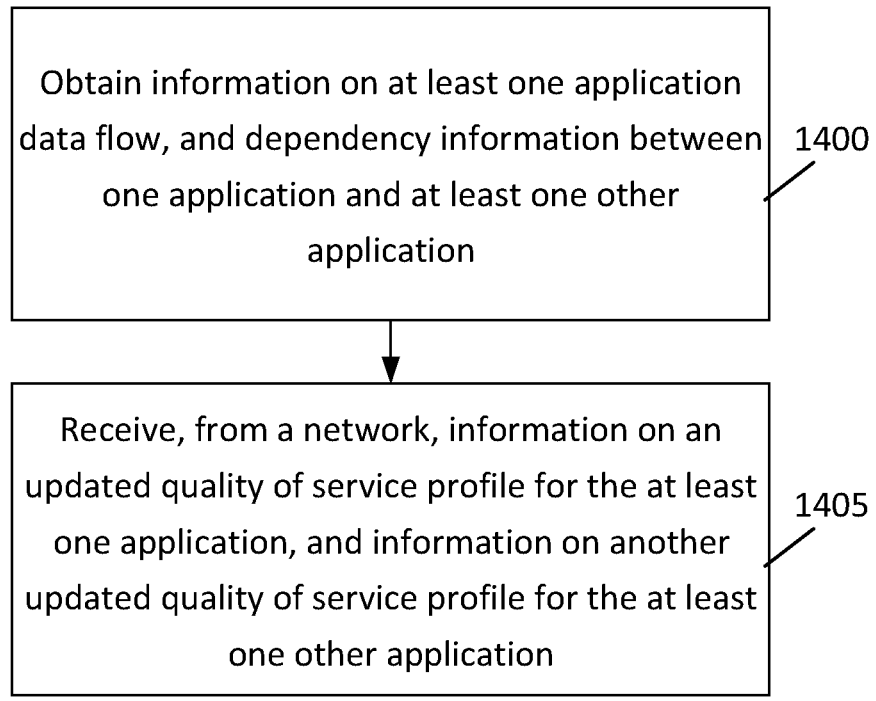
FIG. 14 illustrates an example flow diagram of a method, according to certain example embodiments.

FIG. 14 illustrates an example flow diagram of a method, according to certain example embodiments. In an example embodiment, the method of FIG. 14 may be performed by a network entity, or a group of multiple network elements in a 3GPP system, such as LTE, 5G-NR, 6G, etc. For instance, in an example embodiment, the method of FIG. 14 may be performed by a UE or computer implementing an application and/or AF, the UE and computer being similar to one of apparatuses 10 or 20 illustrated in FIG. 17.

According to certain example embodiments, the method of FIG. 14 may include, at 1400, obtain information on at least one application data flow, and dependency information between one application and at least one other application. According to certain example embodiments, the at least one application data flow may be configured to operate under a quality of service profile, and the at least one other application may be configured to operate under another quality of service profile. According to certain example embodiments, a dependency graph may be based on (e.g., generated based on) the information on the at least one application data flow and the dependency information. The method may also include, at 1405, receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

According to certain example embodiments, the method may further include generating the dependency graph. According to some example embodiments, the method may also include transmitting the information on at least one application data flow, and the dependency information to a network element. According to further example embodiments, the method may also include scheduling a task based on the updated quality of service profile or the another updated quality of service profile.

In certain example embodiments, the method may further include generating a dependency graph based on the information on at least one application data flow, and the dependency information. In some example embodiments, the updated quality of service profile and the another quality of service profile may be received based on the dependency graph. In other example embodiments, the updated quality of service profile and the another updated quality of service profile may be dependent on a respective relative priority or a target completion time of the task. In further example embodiments, the method may further include receiving, from the network element, a notification that a quality of service of the at least one application data flow is not achieved.

According to certain example embodiments, the method may also include calculating, in response to the notification, a new quality of service scheduling for the at least one application data flow. According to some example embodiments, the method may further include transmitting a request to the network element for the updated quality of service profile for the at least one application, and the another updated quality of service profile for the at least one other application.

Figure 15:
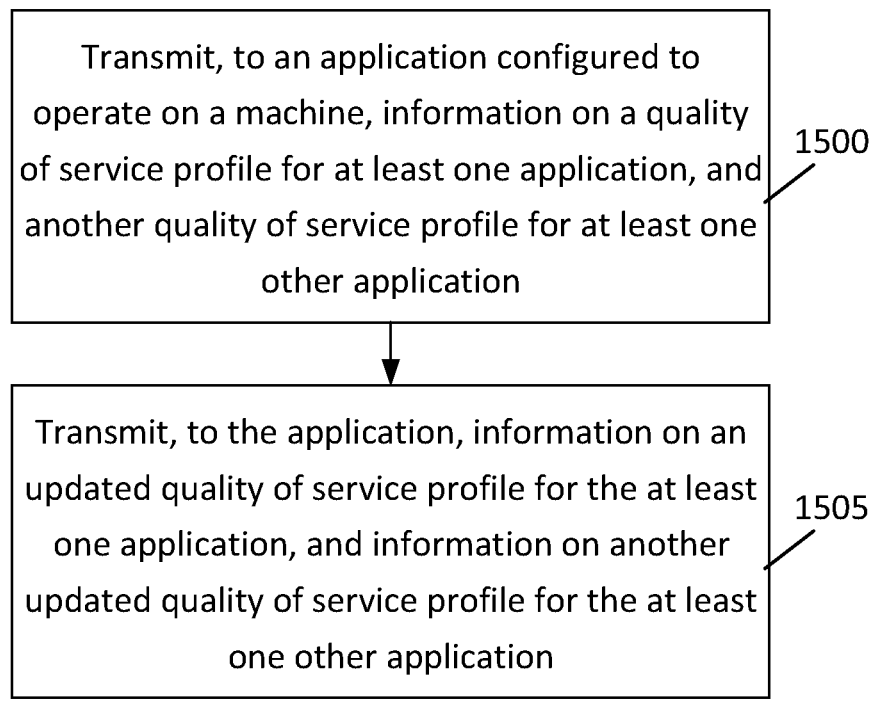
FIG. 15 illustrates an example flow diagram of another method, according to certain example embodiments.

FIG. 15 illustrates an example flow diagram of another method, according to certain example embodiments. In an example embodiment, the method of FIG. 15 may be performed by a network entity, or a group of multiple network elements in a 3GPP system, such as LTE, 5G-NR, 6G, etc. For instance, in an example embodiment, the method of FIG. 15 may be performed by a network entity similar to one of the apparatus 10 or 20 illustrated in FIG. 17. For instance, in an example embodiment, the method of FIG. 15 may be performed by a group of network (e.g., a network comprising a 5G core, a 5G RAN, or any combination of network elements of a 5G core and/or 5G RAN) including network entities or elements implemented by apparatuses similar to apparatuses 10 or 20 illustrated in FIG. 17.

According to certain example embodiments, the method of FIG. 15 may include, at 1500, transmitting, to an application configured to operate on a machine, information on a quality of service profile for at least one application, and another quality of service profile for at least one other application. According to certain example embodiments, the information on at least one application data flow, and dependency information between the application and at least one other application may be used to generate a dependency graph. The method may also include, at 1505, transmitting, to the application, information on an updated quality of service profile for the at least one application, and information on another updated quality of service profile for the at least one other application. According to certain example embodiments, the updated quality of service profile and the another updated quality of service profile may be selected based on the dependency graph According to certain example embodiments, the method may further include generating a dependency graph based on the information on at least one application data flow, and the dependency information. According to some example embodiments, the updated quality of service profile and the another quality of service profile may be transmitted based on based on the dependency graph. According to other example embodiments, the method may further include steering network connectivity of a user equipment to the apparatus based on the dependency graph. According to further example embodiments, the method may also include transmitting, to the application operating on the machine, a notification that a quality of service of the at least one application data flow is not achieved and/or achievable.

In certain example embodiments, the method may further include receiving, from a network element, a notification that a quality of service of the at least one application data flow is not achieved. In some example embodiments, the method may also include calculating, in response to the notification, a new quality of service scheduling for the at least one application data flow. In other example embodiments, the method may further include operating under a learning mode. In certain example embodiments, under the learning mode, the method may include learning when a quality of service of the at least one application data flow is not achieved, and the dependency information between the application and the at least one other application, and automatically notifying the application running on the machine of the updated quality of service profile for the application, and the another updated quality of service profile for the at least one other application.

Figure 16:
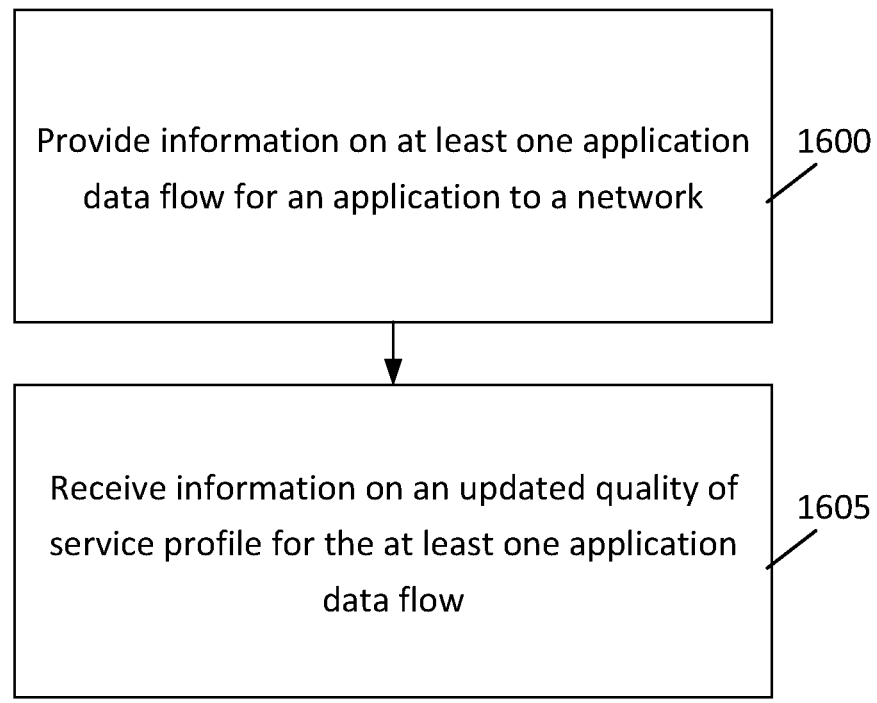
FIG. 16 illustrates an example flow diagram of a further method, according to certain example embodiments.

FIG. 16 illustrates an example flow diagram of a further method, according to certain example embodiments. In an example embodiment, the method of FIG. 16 may be performed by a network entity, or a group of multiple network elements in a 3GPP system, such as LTE, 5G-NR, 6G, etc. For instance, in an example embodiment, the method of FIG. 16 may be performed by a UE similar to one of apparatuses 10 or 20 illustrated in FIG. 17.

According to certain example embodiments, the method of FIG. 16 may include, at 1600, providing information on at least one application data flow for an application to a network. According to certain example embodiments, the at least one application data flow may be configured to operate according to a quality of service profile. According to some example embodiments, a quality of service degradation of the at least one application data flow may be detected based on the provided information. The method may also include, at 1605, receiving information on an updated quality of service profile for the at least one application data flow. According to certain example embodiments, the updated quality of service profile may be selected based on a dependency graph representing a dependency between the application and at least one other application.

According to certain example embodiments, the updated quality of service profile may be dependent on a respective relative priority or a target completion time of the task. According to other example embodiments, the method may also include establishing protocol data unit session with the network based on the updated quality of service profile for the at least one application data flow.

Figure 17:
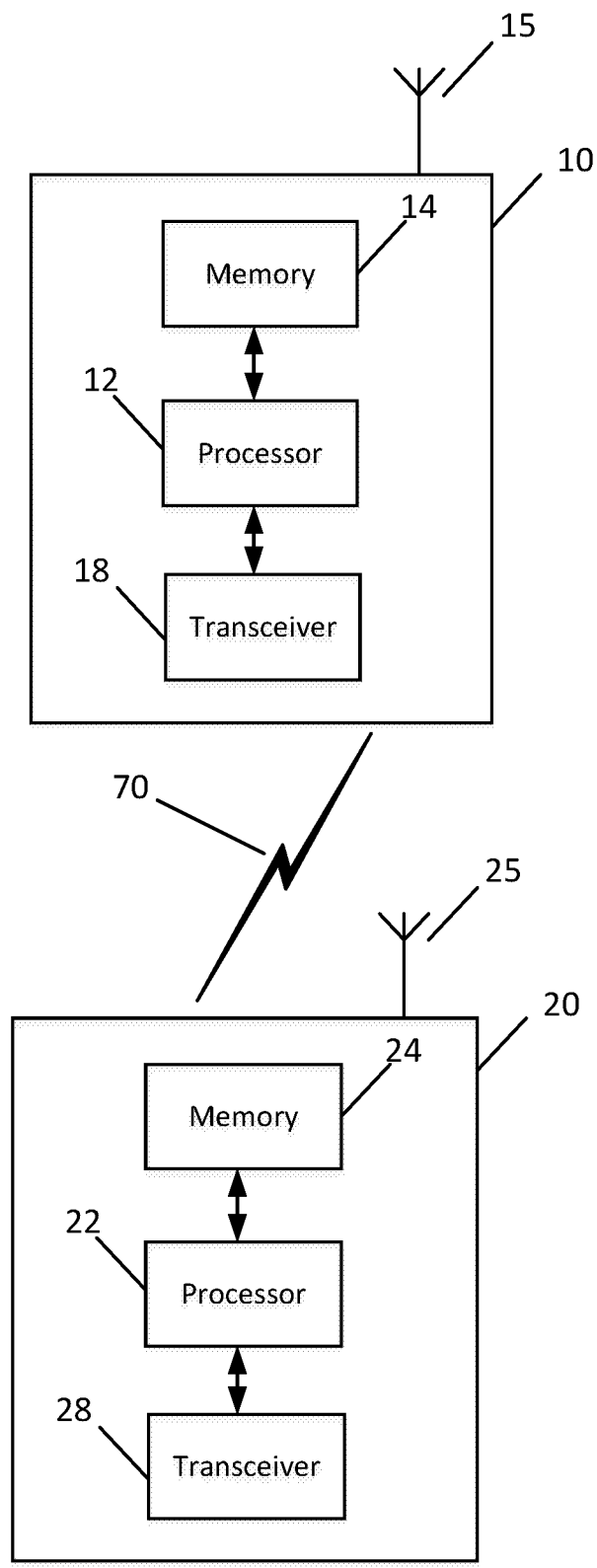
FIG. 17 illustrates a set of apparatuses, according to certain example embodiments.

FIG. 17 illustrates a set of apparatuses 10 and 20 according to certain example embodiments. In certain example embodiments, apparatuses 10 and 20 may be elements in a communications network or associated with such a network. For example, apparatus 10 may represent an AF or application implemented on a computing device or machine such as, for example, a UE, and apparatus 20 may represent one or more entities or elements (e.g., NEF, PCF, gNB, etc.) of a network (e.g., core network and/or RAN network). For example, in certain example embodiments, apparatus 20 may be configured to operate as one or more entities or elements (e.g., NEF, PCF, gNB, etc.) of a network (e.g., core network and/or RAN network). For example, apparatus 20 may be configured to perform functions of one or more entities or elements (e.g., NEF, PCF, gNB, etc.) of a network (e.g., core network and/or RAN network). In some example embodiments, the core may be implemented as a 4G core network, a 5G core network, a 6G core network, etc. In some example embodiments, the RAN may be implemented as a 4G RAN network, a 5G RAN network, a 6G RAN network, etc.

In some example embodiments, apparatuses 10 and 20 may include one or more processors, one or more computer-readable storage medium (for example, memory, storage, or the like), one or more radio access components (for example, a modem, a transceiver, or the like), and/or a user interface. In some example embodiments, apparatuses 10 and 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatuses 10 and 20 may include components or features not shown in FIG. 17.

As illustrated in the example of FIG. 17 apparatuses 10 and 20 may include or be coupled to a processors 12 and 22 for processing information and executing instructions or operations. Processors 12 and 22 may be any type of general or specific purpose processor. In fact, processors 12 and 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processors 12 and 22 is shown in FIG. 16, multiple processors may be utilized according to other example embodiments. For example, it should be understood that, in certain example embodiments, apparatuses 10 and 20 may include two or more processors that may form a multiprocessor system (e.g., in this case processors 12 may represent a multiprocessor) that may support multiprocessing. According to certain example embodiments, the multiprocessor system may be tightly coupled or loosely coupled (e.g., to form a computer cluster).

Processors 12 and 22 may perform functions associated with the operation of apparatuses 10 and 20 including, as some examples, precoding of antenna gain/phase parameters, encoding and decoding of individual bits forming a communication message, formatting of information, and overall control of the apparatuses 10 and 20, including processes and examples illustrated in FIGS. 1-16.

Apparatuses 10 and 20 may further include or be coupled to a memories 14 and 24 (internal or external), which may be respectively coupled to processors 12 and 24 for storing information and instructions that may be executed by processors 12 and 24. Memories 14 and 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14 and 24 can be comprised of any combination of random access memory (RAM), read only memory (ROM), static storage such as a magnetic or optical disk, hard disk drive (HDD), or any other type of non-transitory machine or computer readable media. The instructions stored in memories 14 and 24 may include program instructions or computer program code that, when executed by processors 12 and 22, enable the apparatuses 10 and 20 to perform tasks as described herein.

In certain example embodiments, apparatuses 10 and 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12 and 22 and/or apparatuses 10 and 20 to perform any of the methods and examples illustrated in FIGS. 1-16.

In some example embodiments, apparatuses 10 and 20 may also include or be coupled to one or more antennas 15 and 25 for receiving a downlink signal and for transmitting via an UL from apparatuses 10 and 20. Apparatuses 10 and 20 may further include a transceivers 18 and 28 configured to transmit and receive information. The transceivers 18 and 28 may also include a radio interface (e.g., a modem) coupled to the antennas 15 and 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18 and 28 may be configured to modulate information on to a carrier waveform for transmission by the antennas 15 and 25 and demodulate information received via the antenna 15 and 25 for further processing by other elements of apparatuses 10 and 20. In other example embodiments, transceivers 18 and 28 may be capable of transmitting and receiving signals or data directly. Additionally or alternatively, in some example embodiments, apparatus 10 may include an input and/or output device (I/O device). In certain example embodiments, apparatuses 10 and 20 may further include a user interface, such as a graphical user interface or touchscreen.

In certain example embodiments, memories 14 and 34 store software modules that provide functionality when executed by processors 12 and 22. The modules may include, for example, an operating system that provides operating system functionality for apparatuses 10 and 20. The memory may also store one or more functional modules, such as an application or program, to provide additional functionality for apparatuses 10 and 20. The components of apparatuses 10 and 20 may be implemented in hardware, or as any suitable combination of hardware and software. According to certain example embodiments, apparatuses 10 and 20 may optionally be configured to communicate each other (in any combination) via a wireless or wired communication links 70 according to any radio access technology, such as NR.

According to certain example embodiments, processors 12 and 22 and memories 14 and 24 may be included in or may form a part of processing circuitry or control circuitry. In addition, in some example embodiments, transceivers 18 and 28 may be included in or may form a part of transceiving circuitry.

For instance, in certain example embodiments, apparatus 10 may be controlled by memory 14 and processor 12 to obtain information on at least one application data flow, and dependency information between one application and at least one other application. According to certain example embodiments, the at least one application data flow may be configured to operate under a quality of service profile, and the at least one other application is configured to operate under another quality of service profile. According to other example embodiments, a dependency graph may be based on (e.g., generated based on) the information on the at least one application data flow and the dependency information. Apparatus 10 may also be controlled by memory 14 and processor 12 to receive, from a network, information on an updated quality of service profile for the at least one application, and information on another updated quality of service profile for the at least one other application. According to certain example embodiments, the updated quality of service profile and the another updated quality of service profile are selected based on the dependency graph.

In other example embodiments, apparatus 10 may be controlled by memory 14 and processor 12 to provide information on at least one application data flow for an application to a network. According to certain example embodiments, the at least one application data flow may be configured to operate according to a quality of service profile. According to some example embodiments, a quality of service degradation of the at least one application data flow may be detected based on the provided information. Apparatus 10 may also be controlled by memory 14 and processor 12 to receive information on an updated quality of service profile for the at least one application data flow. According to certain example embodiments, the updated quality of service profile may be selected based on a dependency graph representing a dependency between the application and at least one other application.

In other example embodiments, apparatus 20 may be controlled by memory 24 and processor 22 to transmit, to an application configured to operate on a machine, information on a quality of service profile for at least one application, and another quality of service profile for at least one other application. According to certain example embodiments, the information on at least one application data flow, and dependency information between the application and at least one other application may be used to generate a dependency graph. Apparatus 20 may also be controlled by memory 24 and processor 22 to transmit, to the application, information on an updated quality of service profile for the at least one application, and information on another updated quality of service profile for the at least one other application. According to certain example embodiments, the updated quality of service profile and the another updated quality of service profile may be selected based on the dependency graph.

According to certain example embodiments, apparatus 10 may further be controlled by memory 24 and processor 22 to generate a dependency graph based on the information on at least one application data flow, and the dependency information. According to some example embodiments, the updated quality of service profile and the another quality of service profile may be transmitted based on based on the dependency graph. According to further example embodiments, apparatus 10 may also be caused to steer network connectivity of a user equipment to the apparatus based on the dependency graph.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for obtaining information on at least one application data flow, and dependency information between one application and at least one other application. According to certain example embodiments, the at least one application data flow may be configured to operate under a quality of service profile, and the at least one other application is configured to operate under another quality of service profile. According to other example embodiments, a dependency graph may be based on (e.g., generated based on) the information on the at least one application data flow and the dependency information. The apparatus may also include receiving, from a network, information on an updated quality of service profile for the at least one application, and information on another updated quality of service profile for the at least one other application. According to certain example embodiments, the updated quality of service profile and the another updated quality of service profile may be selected based on the dependency graph.

Additional example embodiments may be directed to an apparatus that includes means for performing any of the methods described herein including, for example, means for transmitting, to an application configured to operate on a machine, information on a quality of service profile for at least one application, and another quality of service profile for at least one other application. According to certain example embodiments, the information at least one application data flow, and dependency information between the application and at least one other application may be used to generate a dependency graph. The apparatus may also include means for transmitting, to the application, information on an updated quality of service profile for the at least one application, and information on another updated quality of service profile for the at least one other application. According to certain example embodiments, the updated quality of service profile and the another updated quality of service profile may be selected based on the dependency graph.

Further example embodiments may be directed to an apparatus that includes means for performing any of the methods described herein including, for example, means for providing information on at least one application data flow for an application to a network. According to certain example embodiments, the at least one application data flow may be configured to operate according to a quality of service profile. According to other example embodiments, a quality of service degradation of the at least one application data flow may be detected based on the provided information. The apparatus may also include means for receiving information on an updated quality of service profile for the at least one application data flow. According to certain example embodiments, the updated quality of service profile may be selected based on a dependency graph representing a dependency between the application and at least one other application.

Certain example embodiments described herein provide several technical improvements, enhancements, and/or advantages. For instance, in some example embodiments, it may be possible to enable the network to react to observed degradation by changing assigned QoS profiles of dependent tasks or to assign the higher QoS profiles to applications associated. This in turn enables the prioritization of tasks while optimizing for priority/target completion time/overall network usage when applicable.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although some of the above embodiments refer to 5G NR and LTE technology, the above embodiments may also apply to any other present or future 3GPP technology, such as 6G, LTE-advanced, and/or fourth generation (4G) technology.

Partial Glossary

3GPP 3rd Generation Partnership Project
5G 5th Generation

5GCN 5G Core Network
5GS 5G System
AF Application Function
AGV Automated Guide Vehicle
AMF Access and Mobility Management Function
API Application Programming Interface
BS Base Station
DL Downlink
eNB Enhanced Node B
E-UTRAN Evolved UTRAN
gNB 5G or Next Generation NodeB
LTE Long Term Evolution
OT Operational Technology
NEF Network Exposure Function
NR New Radio
NW Network
PCC Policy and Charging Control
PCF Policy Control Function
QoS Quality of Service
RAN Radio Access Network
SMF Session Management Function
UE User Equipment
UL Uplink

We claim:

1. An apparatus, comprising:
   at least one processor; and
   at least one memory storing instructions that, when executed by the at least one processor, cause the apparatus at least to:
   obtain information on at least one application data flow, and dependency information between one application and at least one other application, wherein the at least one application data flow is configured to operate under a quality of service profile, and the at least one other application is configured to operate under another quality of service profile, wherein the quality of service profile defines a mode of operation of the at least one application data flow and the another quality of service profile defines a mode of operation of the at least one other application, and wherein a dependency graph is based on the information on the at least one application data flow and the dependency information; and
   receive, from a network, information on an updated quality of service profile for the at least one application, and information on another updated quality of service profile for the at least one other application,
   wherein the updated quality of service profile and the another updated quality of service profile are selected based on the dependency graph, and wherein the updated quality of service profile is configured to cause an update to the mode of operation of the at least one application data flow and the another updated quality of service profile is configured to cause an update to the mode of operation of the at least one other application.

2. The apparatus according to claim 1, wherein the apparatus is further caused to:
   generate the dependency graph.

3. The apparatus according to claim 1, wherein the apparatus is further caused to:
   transmit the information on at least one application data flow, and the dependency information to a network element.

4. The apparatus according to claim 1, wherein the apparatus is further caused to:
   schedule a task based on the updated quality of service profile or the another updated quality of service profile.

5. The apparatus according to claim 1, wherein the apparatus is further caused to:
   generate a dependency graph based on the information on at least one application data flow, and the dependency information,
   wherein the updated quality of service profile and the another quality of service profile is received based on the dependency graph.

6. The apparatus according to claim 4, wherein the updated quality of service profile and the another updated quality of service profile are dependent on a respective relative priority or a target completion time of the task.

7. The apparatus according to claim 1, wherein the at least one memory and the instructions, when executed by the at least one processor, further cause the apparatus at least to:
   receive, from a network element, a notification that a quality of service of the at least one application data flow is not achieved; and
   calculate, in response to the notification, a new quality of service scheduling for the at least one application data flow.

8. The apparatus according to claim 1, wherein the at least one memory and the instructions, when executed by the at least one processor, further cause the apparatus at least to:
   transmit a request to a network element for the updated quality of service profile for the at least one application, and the another updated quality of service profile for the at least one other application.

9. An apparatus, comprising:
   at least one processor; and
   at least one memory storing instructions that, when executed by the at least one processor, cause the apparatus at least to:
   transmit, to an application configured to operate on a machine, information on a quality of service profile for at least one application, and another quality of service profile for at least one other application, and dependency information between the application and at least one other application that is used to generate a dependency graph, and wherein the quality of service profile defines a mode of operation of the at least one application and the another quality of service profile defines a mode of operation of the at least one other application; and
   transmit, to the application, information on an updated quality of service profile for the at least one application, and information on another updated quality of service profile for the at least one other application, wherein the updated quality of service profile and the another updated quality of service profile are selected based on the dependency graph, and wherein the updated quality of service profile is configured to cause an update to the mode of operation of the at least one application and the another updated quality of service profile is configured to cause an update to the mode of operation of the at least one other application.

10. The apparatus according to claim 9, wherein the at least one memory and the instructions, when executed by the at least one processor, further cause the apparatus at least to:
    generate a dependency graph based on the information on at least one application data flow, and the dependency information,
    wherein the updated quality of service profile and the another quality of service profile is transmitted based on based on the dependency graph.

11. The apparatus according to claim 10, wherein the at least one memory and the instructions, when executed by the at least one processor, further cause the apparatus at least to:
steer network connectivity of a user equipment to the apparatus based on the dependency graph.

12. The apparatus according to claim 9, wherein the at least one memory and the instructions, when executed by the at least one processor, further cause the apparatus at least to:
transmit, to the application operating on the machine, a notification that a quality of service of the at least one application data flow is not achieved and/or achievable.

13. The apparatus according to claim 9, wherein the at least one memory and the instructions, when executed by the at least one processor, further cause the apparatus at least to:
receive, from a network element, a notification that a quality of service of the at least one application data flow is not achieved; and
calculate, in response to the notification, a new quality of service scheduling for the at least one application data flow.

14. An apparatus, comprising:
at least one processor; and
at least one memory storing instructions that, when executed by the at least one processor, cause the apparatus at least to:
provide information on at least one application data flow for an application to a network, wherein the at least one application data flow is configured to operate according to a quality of service profile, wherein the quality of service profile defines a mode of operation of the at least one application data flow, and wherein a quality of service degradation of the at least one application data flow is detected based on the provided information; and
receive information on an updated quality of service profile for the at least one application data flow, wherein the updated quality of service profile is selected based on a dependency graph representing a dependency between the application and at least one other application, and wherein the updated quality of service profile is configured to cause an update to the mode of operation of the at least one application data flow.

15. The apparatus according to claim 14, wherein the updated quality of service profile is dependent on a respective relative priority or a target completion time of a task.

16. The apparatus according to claim 14, wherein the apparatus is further caused to:
establish protocol data unit session with the network based on the updated quality of service profile for the at least one application data flow.

17. A method, comprising:
obtaining information on at least one application data flow, and dependency information between one application and at least one other application, wherein the at least one application data flow is configured to operate under a quality of service profile, and the at least one other application is configured to operate under another quality of service profile, wherein the quality of service profile defines a mode of operation of the at least one application data flow and the another quality of service profile defines a mode of operation of the at least one other application, and wherein a dependency graph is based on the information on the at least one application data flow and the dependency information; and
receiving, from a network, information on an updated quality of service profile for the at least one application, and information on another updated quality of service profile for the at least one other application,
wherein the updated quality of service profile and the another updated quality of service profile are selected based on the dependency graph, and wherein the updated quality of service profile causes an update to the mode of operation of the at least one application data flow and the another updated quality of service profile causes an update to the mode of operation of the at least one other application.

18. The method according to claim 17, further comprising:
transmitting the information on at least one application data flow, and the dependency information to a network element.

19. The method according to claim 17, further comprising:
scheduling a task based on the updated quality of service profile or the another updated quality of service profile.

20. The method according to claim 17, further comprising:
generating a dependency graph based on the information on at least one application data flow, and the dependency information,
wherein the updated quality of service profile and the another quality of service profile is received based on the dependency graph.

* * * * *